United States Patent
Kirmse

(10) Patent No.: US 12,399,706 B2
(45) Date of Patent: *Aug. 26, 2025

(54) CLOUD VERSION MANAGEMENT FOR LEGACY ON-PREMISE APPLICATION

(71) Applicant: SAP SE, Walldorf (DE)

(72) Inventor: Daniel Kirmse, Berlin (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/398,801

(22) Filed: Dec. 28, 2023

(65) Prior Publication Data
US 2024/0126540 A1    Apr. 18, 2024

Related U.S. Application Data

(63) Continuation of application No. 17/484,667, filed on Sep. 24, 2021, now Pat. No. 11,922,163.

(51) Int. Cl.
*G06F 8/65* (2018.01)
*G06F 8/656* (2018.01)
(Continued)

(52) U.S. Cl.
CPC ............... *G06F 8/656* (2018.02); *G06F 9/48* (2013.01); *H04L 67/10* (2013.01); *G06F 8/65* (2013.01); *G06F 8/71* (2013.01)

(58) Field of Classification Search
CPC ... G06F 8/656; G06F 8/65; G06F 8/71; G06F 9/48; H04L 67/10
See application file for complete search history.

(56) References Cited

U.S. PATENT DOCUMENTS

| 9,817,653 B2 | 11/2017 | Sreedharan et al. |
| 10,320,625 B1 | 6/2019 | Cherumbath |

(Continued)

FOREIGN PATENT DOCUMENTS

| CN | 103268319 A | 8/2013 |
| CN | 110347440 A | 10/2019 |

(Continued)

OTHER PUBLICATIONS

Katarina Grolinger et al., Data management in cloud environments: NoSQL and NewSQL data stores, 2013, [Retrieved on Mar. 3, 2025]. Retrieved from the internet: <URL: https://link.springer.com/content/pdf/10.1186/2192-113X-2-22.pdf> 24 Pages (1-24) (Year: 2013).*

(Continued)

*Primary Examiner* — Anibal Rivera
(74) *Attorney, Agent, or Firm* — SCHWEGMAN LUNDBERG & WOESSNER, P.A.

(57) ABSTRACT

Various examples are directed to systems and methods for upgrading a cloud-implemented application. A cloud service may receive a request from a user group to access the application. The cloud service may access consumer context data comprising a plurality of context properties of the user group and may access a rollout strategy map comprising a first rollout record. The cloud service may compare the plurality of context properties of the first user group to first selector data indicated by a first rollout record. Based on the comparing, the cloud service may add the first version of the application to a list of permissible versions for the first user group.

20 Claims, 21 Drawing Sheets

(51) Int. Cl.
  *G06F 8/71* (2018.01)
  *G06F 9/48* (2006.01)
  *G06F 9/54* (2006.01)
  *H04L 67/10* (2022.01)

(56) References Cited

U.S. PATENT DOCUMENTS

| | | | |
|---|---|---|---|
| 10,338,964 | B1 | 7/2019 | Kancharla et al. |
| 10,387,385 | B1 | 8/2019 | Mart |
| 10,496,392 | B2 | 12/2019 | Shuvali et al. |
| 10,732,951 | B2 | 8/2020 | Jayanthi et al. |
| 10,853,146 | B1 | 12/2020 | Talayco |
| 11,113,090 | B1 | 9/2021 | Wilkinson et al. |
| 11,372,820 | B1 | 6/2022 | Harjono et al. |
| 11,704,408 | B1 | 7/2023 | Ciubotariu et al. |
| 11,841,731 | B2 | 12/2023 | Kirmse |
| 12,013,866 | B2 | 6/2024 | Kirmse |
| 12,026,496 | B2 | 7/2024 | Kirmse |
| 2006/0167947 | A1 | 7/2006 | Dunkle |
| 2007/0067361 | A1 | 3/2007 | Bailey et al. |
| 2009/0177646 | A1 | 7/2009 | Pham et al. |
| 2011/0083138 | A1 | 4/2011 | Sivasubramanian et al. |
| 2013/0190080 | A1 | 7/2013 | Bibbey et al. |
| 2013/0263088 | A1 | 10/2013 | Hoff et al. |
| 2016/0188415 | A1 | 6/2016 | Karinta et al. |
| 2016/0275019 | A1 | 9/2016 | Nam et al. |
| 2016/0294614 | A1 | 10/2016 | Searle et al. |
| 2017/0046181 | A1 | 2/2017 | Williams et al. |
| 2017/0115978 | A1 | 4/2017 | Modi et al. |
| 2017/0161053 | A1 | 6/2017 | Hayakawa et al. |
| 2017/0192873 | A1 | 7/2017 | Ozdemir et al. |
| 2017/0300311 | A1 | 10/2017 | Vasquez Lopez et al. |
| 2017/0330195 | A1 | 11/2017 | Lange et al. |
| 2018/0004792 | A1 | 1/2018 | Desai et al. |
| 2018/0011699 | A1 | 1/2018 | Manthiramoorthy et al. |
| 2018/0267796 | A1 | 9/2018 | Kennedy et al. |
| 2019/0102280 | A1 | 4/2019 | Caldato et al. |
| 2019/0146772 | A1 | 5/2019 | Griffin et al. |
| 2019/0317887 | A1 | 10/2019 | Wiener et al. |
| 2019/0327294 | A1* | 10/2019 | Subramani Nadar ............ H04L 41/0843 |
| 2019/0370471 | A1 | 12/2019 | Petratos et al. |
| 2020/0019414 | A1 | 1/2020 | Byard et al. |
| 2020/0145337 | A1 | 5/2020 | Keating et al. |
| 2020/0228602 | A1 | 7/2020 | Spoczynski et al. |
| 2020/0241864 | A1* | 7/2020 | Duvur ............... G06F 8/65 |
| 2020/0322226 | A1* | 10/2020 | Mishra ............ H04L 43/0876 |
| 2021/0049267 | A1 | 2/2021 | Wu et al. |
| 2022/0050674 | A1 | 2/2022 | Liljeback et al. |
| 2022/0107802 | A1 | 4/2022 | Rao et al. |
| 2022/0292106 | A1 | 9/2022 | Umay et al. |
| 2022/0294788 | A1 | 9/2022 | Pattar et al. |
| 2022/0350642 | A1 | 11/2022 | Poddar et al. |
| 2022/0365801 | A1 | 11/2022 | Kasso et al. |
| 2023/0070209 | A1 | 3/2023 | Srinivasan et al. |
| 2023/0096143 | A1 | 3/2023 | Kirmse |
| 2023/0098023 | A1 | 3/2023 | Kirmse |
| 2023/0102514 | A1 | 3/2023 | Kirmse |
| 2023/0102769 | A1 | 3/2023 | Kirmse |
| 2023/0103087 | A1 | 3/2023 | Kirmse |
| 2023/0103223 | A1 | 3/2023 | Kirmse |

FOREIGN PATENT DOCUMENTS

| | | |
|---|---|---|
| CN | 108595221 B | 4/2021 |
| EP | 3451341 A1 | 3/2019 |
| EP | 3557408 A1 | 10/2019 |
| WO | WO-2013148144 A1 | 10/2013 |
| WO | WO-2016028973 A1 | 2/2016 |

OTHER PUBLICATIONS

"U.S. Appl. No. 17/484,637, Final Office Action mailed Mar. 23, 2023", 9 pgs.

"U.S. Appl. No. 17/484,637, Non Final Office Action mailed Aug. 2, 2023", 8 pgs.

"U.S. Appl. No. 17/484,637, Non Final Office Action mailed Nov. 10, 2022", 9 pgs.

"U.S. Appl. No. 17/484,637, Notice of Allowance mailed May 26, 2023", 8 pgs.

"U.S. Appl. No. 17/484,637, Preliminary Amendment filed Jun. 20, 2023", 3 pgs.

"U.S. Appl. No. 17/484,637, Response filed Feb. 10, 2023 to Non Final Office Action mailed Nov. 10, 2022", 12 pgs.

"U.S. Appl. No. 17/484,637, Response filed May 4, 2023 to Final Office Action mailed Mar. 23, 2023", 12 pgs.

"U.S. Appl. No. 17/484,637, Response filed Nov. 2, 2023 to Non Final Office Action mailed Aug. 2, 2023", 9 pgs.

"U.S. Appl. No. 17/484,667, Notice of Allowance mailed Apr. 12, 2023", 22 pgs.

"U.S. Appl. No. 17/484,667, Notice of Allowance mailed Jul. 10, 2023", 8 pgs.

"U.S. Appl. No. 17/484,667, Notice of Allowance mailed Nov. 7, 2023", 8 pgs.

"U.S. Appl. No. 17/484,667, Preliminary Amendment filed Jun. 20, 2023", 3 pgs.

"U.S. Appl. No. 17/484,688, Non Final Office Action mailed Nov. 25, 2022", 20 pgs.

"U.S. Appl. No. 17/484,688, Notice of Allowance mailed May 3, 2023", 15 pgs.

"U.S. Appl. No. 17/484,688, Notice of Allowance mailed Jul. 31, 2023", 18 pgs.

"U.S. Appl. No. 17/484,688, Response filed Feb. 27, 2023 to Non Final Office Action mailed Nov. 25, 2022", 10 pgs.

Afgan, Enis, et al., "CloudLaunch: Discover and Deploy Cloud Applications", arXiv:1805.04005, [Online]. Retrieved from the Internet: <URL: https://arxiv.Org/ftp/arxiv/papers/1805/1805.04005.pdf>, (2018), 9 pgs.

Lyublena, Antova, "Rapid Adoption of Cloud Data Warehouse Technology using Datometry Hyper-Q (Technical White Paper)", Datometry Inc., [Online]. Retrieved from the Internet: <https://dl.acm.org/doi/pdf/10.1145/3183713.3190652>, (2018), 1-12.

Sharma, Prateek, "Containers and Virtual Machines at Scale: A Comparative Study", Proceedings of the 17th International Middleware Conference, Article No. 1, [Online]. Retrieved from the Internet: <https://dl.acm.org/doi/pdf/10.1145/2988336.2988337>, (2016), 1-13.

Zurkowski, Bartosz, "Towards Self-organizing Cloud Polyglot Database Systems", IEEE 13th International Conference on Self-Adaptive and Self-Organizing Systems, [Online] Retrieved from the internet: <https://ieeexplore.ieee.org/stamp/stamp.jsp?tp=&arnumber=8780526>, (2019), 82-87.

"European Application Serial No. 22196329.1, Extended European Search Report mailed Mar. 1, 2023", 14 pgs.

"U.S. Appl. No. 17/484,704, Non Final Office Action mailed Mar. 31, 2023", 12 pgs.

"U.S. Appl. No. 17/484,754, Non Final Office Action mailed Apr. 13, 2023", 30 pgs.

"U.S. Appl. No. 17/484,704, Response filed Jun. 21, 2023 to Non Final Office Action mailed Mar. 31, 2023", 10 pgs.

"U.S. Appl. No. 17/484,754, Response filed Jul. 6, 2023 to Non Final Office Action mailed Apr. 13, 2023", 14 pgs.

"U.S. Appl. No. 17/484,704, Final Office Action mailed Sep. 6, 2023", 14 pgs.

"U.S. Appl. No. 17/484,754, Final Office Action mailed Sep. 21, 2023", 34 pgs.

"U.S. Appl. No. 17/484,732, Non Final Office Action mailed Oct. 26, 2023", 27 pgs.

"U.S. Appl. No. 17/484,704, Response filed Dec. 6, 2023 to Final Office Action mailed Sep. 6, 2023", 11 pgs.

"U.S. Appl. No. 17/484,704, Non Final Office Action mailed Dec. 14, 2023", 14 pgs.

"U.S. Appl. No. 17/484,754, Response filed Dec. 21, 2023 to Final Office Action mailed Sep. 21, 2023", 12 pgs.

"U.S. Appl. No. 17/484,732, Response filed Jan. 17, 2024 to Non Final Office Action mailed Oct. 26, 2023", 11 pgs.

"U.S. Appl. No. 17/484,667, Corrected Notice of Allowability mailed Jan. 29, 2024", 13 pgs.

(56) References Cited

OTHER PUBLICATIONS

"U.S. Appl. No. 17/484,637, Notice of Allowance mailed Feb. 15, 2024", 8 pgs.
"U.S. Appl. No. 17/484,732, Notice of Allowance mailed Feb. 22, 2024", 10 pgs.
"U.S. Appl. No. 17/484,704, Examiner Interview Summary mailed Feb. 28, 2024", 2 pgs.
"U.S. Appl. No. 17/484,704, Response filed Feb. 29, 2024 to Non Final Office Action mailed Dec. 14, 2023", 11 pgs.
"U.S. Appl. No. 17/484,754, Non Final Office Action mailed Mar. 7, 2024", 35 pgs.
"U.S. Appl. No. 17/484,754, Examiner Interview Summary mailed May 23, 2024", 3 pgs.
"U.S. Appl. No. 17/484,754, Response filed Jun. 7, 2024 to Non Final Office Action mailed Mar. 7, 2024", 14 pgs.
"U.S. Appl. No. 17/484,704, Notice of Allowance mailed Jul. 18, 2024", 7 pgs.
"U.S. Appl. No. 17/484,754, Notice of Allowance mailed Jul. 31, 2024", 19 pgs.
"U.S. Appl. No. 17/484,754, Corrected Notice of Allowability mailed Aug. 12, 2024", 2 pgs.
"U.S. Appl. No. 17/484,754, PTO Response to Rule 312 Communication mailed Oct. 10, 2024", 2 pgs.
"U.S. Appl. No. 17/484,754,312 Amendment filed Oct. 8, 2024", 6 pgs.
"U.S. Appl. No. 17/484,704, Notice of Allowance mailed Nov. 22, 2024", 7 pgs.
Pahl, Claus, "Containerization and the PaaS Cloud", IEEE Cloud Computing, vol. 1, No. 3, (May 1, 2015), 24-31.
Shah, Jay, "Building Modern Clouds: Using Docker, Kubernetes and Google Cloud Platform", IEEE 9th Annual Computing and Communication Workshop and Conference, (Jan. 7, 2019), 0184-0189.
"European Application Serial No. 22196329.1 Communication pursuant to Rule 94(3) EPC filed on Jun. 6, 2025", 11 pgs.
"Deployment environment", [Online]. Retrieved from the Internet: URL: https: en.wikipedia.org w index.php? title=Deployment_environmentandoldid= 1023026859, (Accessed on May 13, 2021), 5 pgs.

* cited by examiner ously generated application version.

CLOUD VERSION MANAGEMENT FOR LEGACY ON-PREMISE APPLICATION

CROSS-REFERENCE TO RELATED APPLICATIONS

This application is a continuation of prior application Ser. No. 17/484,667, filed on Sep. 24, 2021 and now issued as U.S. Pat. No. 11,922,163, which is incorporated by reference herein in its entirety.

BACKGROUND

Traditionally, software has been self-contained and executed on one or more local machines. An enterprise desiring to use a software tool builds an on-premises computing system and executes a software application to provide the tool on that computing system. The software application may be developed by the enterprise and/or purchased from a third party software provider. Users access the software tool directly from the computing system or remotely via a networked user computing device.

BRIEF DESCRIPTION OF DRAWINGS

The present disclosure is illustrated by way of example and not limitation in the following figures.

DETAILED DESCRIPTION

Figure 1:
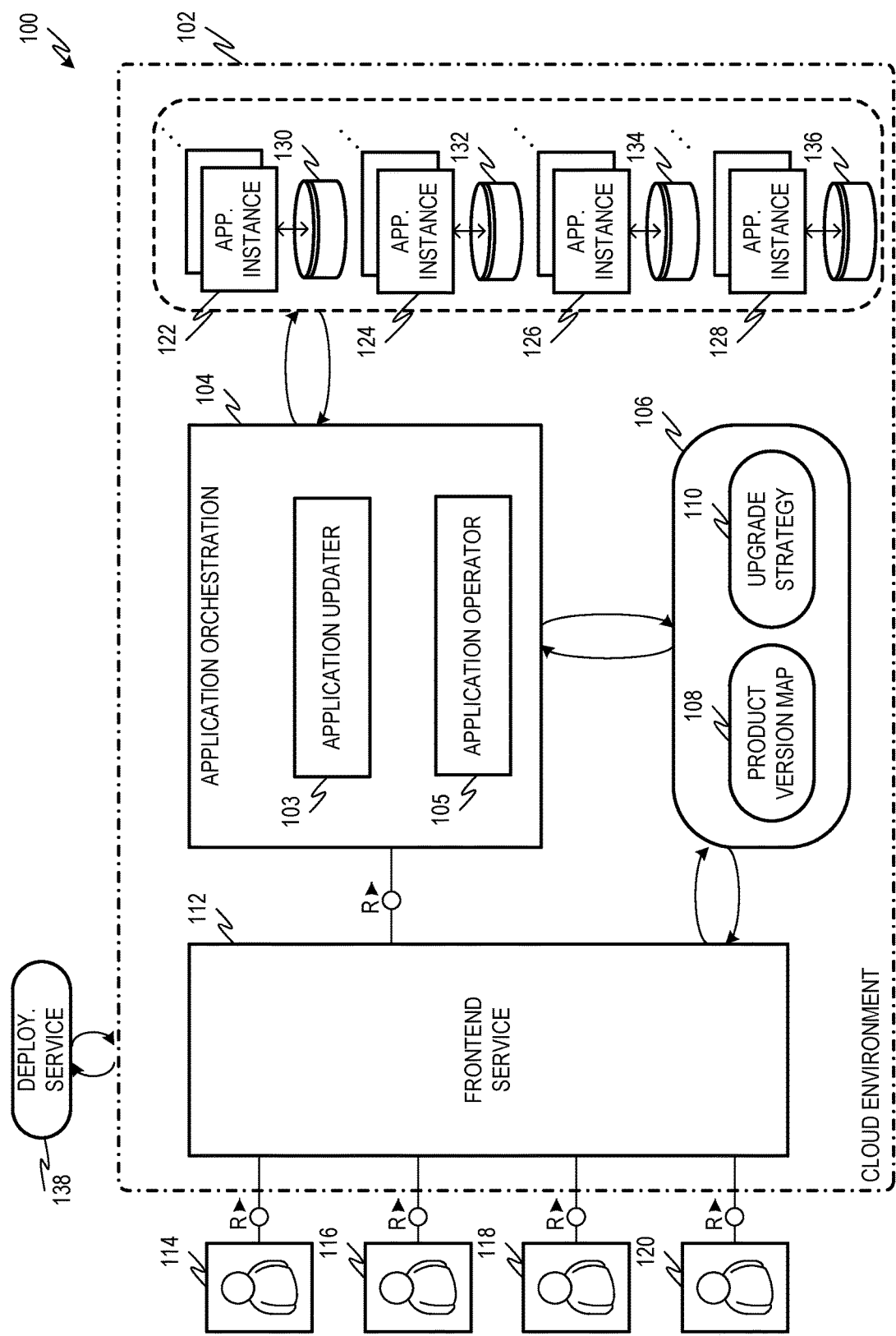
FIG. 1 is a diagram showing one example of an environment for upgrading a legacy on-premises software application in a cloud environment.

An on-premises software application is typically executed by a computing system built by an enterprise on-site or on-premises. An on-premises application may be implemented to include a set of one or more executables, libraries, and the like, that are implemented by a set of executable files, libraries, and the like that are resident at the on-premises computing system. Users associated with the enterprise access the software application from the on-premises computing system.

On-premises software applications are typically characterized by long release cycles. For example, changes to one functionality of the on-premises application may be implemented by changing one or more executables and/or libraries. The executables, libraries, and the like of the on-premises application, however, will typically implement multiple functionalities. This means that changes to one functionality of an on-premises application may require the re-testing of many different functionalities provided by the modified executable and/or library files. Also, when the on-premises application is a database management system, or other application interfacing with a data persistence, changes to the executable(s) and/or libraries for implementing the application may change the way that the application interfaces with the persistence. Accordingly, upgrading the on-premises application may include performing a data migration at the persistence (e.g., from one schema to a target schema). As a result, changes to an on-premises application may be made in batches. In this way, a batch of multiple changes can be tested, de-bugged, and deployed at the same time.

In contrast to an on-premises implementation, some software applications are executed in a cloud environment. A cloud environment includes one or more data centers implementing one or more virtual and/or hardware servers. The cloud environment executes instances of cloud applications. For example, an instance of a cloud application may execute to provide a software tool to a group of users (e.g., a group of users associated with an entity that purchases access to the software tool). Each instance of the cloud application comprises a set of one or more virtual machines and/or containers executing at the cloud environment.

Cloud-native applications are specifically developed to execute in a cloud environment. As a result, many cloud-native applications are designed according to a microservice architecture. In a microservice architecture, an instance of a software application is implemented by a collection of loosely-coupled microservices executing at the cloud environment. Each microservice may also include a single executable that executes in a separate virtual machine (VM) or container implemented by the cloud environment. In a microservice architecture, each microservice is programmed to perform a defined task or small set of tasks and interact with the other microservices in a defined way, for example, according to an application programming interface (API).

The degree of independence between microservices in a microservice-architecture application simplifies the process of testing and upgrading. For example, due to the nature of microservice architecture, a change to one microservice may have a limited effect on other microservices and/or on data persistences used by the microservice-architecture application. Accordingly, many cloud-native microservice-architecture applications support testing and updating via a continuous or ongoing process, such as a continuous integration/continuous delivery (CI/CD) pipeline. In a CI/CD pipeline, a developer can make changes to a subset of the microservices making up an application instance. The changes are implemented as a modified build of the application. The modified build is deployed to various integration and testing environments. Provided that the modified build passes tests at the various integration and testing environments, it may be deployed to one or more cloud environments as a new build. If the new build is found to be defective or to include bugs, it can be rolled back by reverting to a previous version of the build.

In some examples, it is desirable to transition a software application designed for on-premises execution to a cloud environment. Because of the differences between a cloud environment and an on-premises computing system environment, such a transition may be non-trivial. In some examples, the executables, libraries, and the like of the on-premises application are configured to execute in one or more containers at the cloud environment. Orchestration services at the cloud environment may manage the containers executing at the cloud environment to provide instances of the application to groups of users associated with different customers.

In some examples, a legacy on-premises application can be fully re-factored and re-coded to conform to a microservices architecture. Once such a re-factoring and re-coding occurs, the now-cloud-native application may be continuously upgraded using a CI/CD pipeline or similarly continuous technique. Oftentimes, however, it is not desirable to perform a full re-factoring and re-coding of a legacy on-premises application. For example, such a conversion may be time and labor-intensive. Instead of a full re-factoring and recoding, an on-premises application may be subject to a partial re-factoring. In some examples, the existing executable(s) and libraries of an on-premises application are just configured to execute in a cloud-environment-executed container managed by one or more cloud services.

When an on-premises application is not fully-converted to a microservices architecture format, the resulting cloud implementation of the application may be less than optimally-suited for continuous updating. For example, container-implemented executables and/or libraries adapted from an on-premises implementation may not be as independent as a cloud-native applications. Accordingly, changes to one functionality implemented by an executable or library may entail more extensive testing of the other functionalities implemented by the same executable or library or other executables and/or libraries.

Also, a cloud application with container-implemented executables and/or libraries may not be independent of the schema or schemas of the persistences used by the application. Accordingly, updating the application at the cloud may include performing a data migration at one or more cloud persistences to make those persistences consistent with the upgraded application. Such data migrations may be time and resource-intensive and, therefore, difficult to roll back in the event of a bug or other error.

Another example problem with cloud-implemented legacy on-premises applications is that the testing of such applications may be more difficult than with on-premises implementations. For example, an on-premises application may be tested according to a process that involves providing various development versions (e.g., alpha, beta, etc.) to user groups for evaluation and/or early adoption. For example, testers or early adopters of an on-premises application may simply be provided with the relevant executables and/or libraries, which can be loaded on a local machine and/or network for testing. With a cloud implementation, however, making upcoming evaluation or early-adopter versions of an application available to stakeholder user groups is more challenging.

Various examples described herein address these and other issues by utilizing application orchestration services and a product version map. A cloud environment may be arranged to execute instances of different versions of a software application for different groups of users. Each group of users may be associated with a stakeholder, such as a testing or quality assurance (QA) group at the entity providing the software application, a customer using the application, and the like.

The product version map for a software application may include references to different available versions of the software application. The references to different available versions may include identifiers and/or links to one or more container images for executing the referred-to containers, such as Docker® images provided by Docker, Inc. Application orchestration services may provide users with indications of the available versions of the application. A user may select a version of the application for that user and/or for a group of users including the user. In response, the application orchestration services may spin up an instance of the selected version of the application by initiating a container or containers described by the relevant container image. In this way, different users or groups of users may utilize different versions of the application. This may facilitate the testing of legacy on-premises applications that are implemented in the cloud environment. For example, a user group associated with QA or testing may spin up an evaluation version of the application for testing. A user group associated with a preferred customer entity may spin up and test a beta or other evaluation version of the application, and so on.

Releases of the application can be managed by modifying the product version map. For example, when an evaluation version of the application is ready to launch, the product version map may be reconfigured to refer to the previous evaluation version as a new production version.

Use of a product version map, however, may present its own challenges. For example, it may be desirable to program the orchestration services to be agnostic as to the relationship between different versions of the application. In this way, the orchestration services themselves may not need to be re-coded every time there is a change to the available versions. As a consequence of making the orchestration services agonistic as to the relationship between different versions, however, it may become possible for users or user groups to perform changes on their application instances that may not be advisable. For example, a user group may select a version of the application that is not compatible with a persistence associated with that user group and for which no data migration is defined. Also, for example, some available versions of an application may represent a downgrade relative to what the user group is already using.

In various examples, these and other issues may be addressed utilizing an upgrade strategy map. An upgrade strategy map describes allowable upgrades from various source versions of the application to one or more allowable target versions of the application. The upgrade strategy map may comprise upgrade strategy records, where each upgrade strategy record lists a source version of the application and one or more target versions to which the application can be upgraded. When an upgrade is requested for a user or group of users, the orchestration service may retrieve an update strategy record corresponding to the current version of the application for that user group. The update strategy record may comprise an indication of a set of target versions of the application for the current application version. The set of target versions may indicate versions of the application that it is permissible for the group of users to upgrade to from the current version used by the group of users. The set of target versions may be provided to a user or users from the group of users, who may select a target version. In response, the application orchestration service may generate and execute one or more containers at the cloud environment to implement an instance of the selected target version of the application.

FIG. 1 is a diagram showing one example of an arrangement 100 for upgrading a legacy on-premises software application in a cloud environment 102. The cloud environment 102 executes one or more application instances 122, 124, 126, 128 and various services 112, 104 to provide an application, such as a database management application, to one or more user groups 114, 116, 118, 120.

The cloud environment 102 may include one or more computing devices, such as servers, for executing the application instances 122, 124, 126, 128 and services 112, 104. In some examples, the cloud environment 102 is one of a number of cloud environments implemented by a cloud service provider at different geographic locations. For example, the cloud environment 102 may be implemented at a data center or data centers geographically near to the user groups 114, 116, 118, 120 so as to minimize network latencies to the user groups 114, 116, 118, 120. Other cloud environments similar to the cloud environment 102 may be implemented at data centers geographically near to other user groups to provide the application to those user groups.

User groups 114, 116, 118, 120 indicate groups of one or more users who develop and/or use applications instances 122, 124, 126, 128 at the cloud environment 102. In some examples, each user group 114, 116, 118, 120 is associated with a stakeholder. For example, some user groups 114, 116, 118, 120 are associated with stakeholders who are customer entities. A customer entity purchases or otherwise acquires access to application instances 122, 124, 126, 128. A user group 114, 116, 118, 120 associated with a customer entity may include users who utilize one or more application instances 122, 124, 126, 128, for example, use the functionality of the applications. Also, for example, some user groups 114, 116, 118, 120 are associated with internal stakeholders of an entity providing the software application. For example, some user groups 114, 116, 118, 120 may be associated with a development group for developing some or all of the application instances 122, 124, 126, 128, a QA and/or testing user group for testing application instances 122, 124, 126, 128, and/or the like. User groups 114, 116, 118 120 may be associated with one or more application instances 122, 124, 126, 128. For example, the user group 114 may be associated with application instance 122. The user group 116 may be associated with the application instance 124. The user group 118 may be associated with application instance 126. The user group 120 may be associated with application instance 128, and so on. In some examples, a user group 114, 116, 118, 120 may be associated with more than one instance of the application. For example, a user group 114, 116, 118, 120 may execute an instance of the application for a production implementation and another instance or instances of the application for a testing or evaluation use.

The cloud environment 102 also implements persistences 130, 132, 134, 136. For examples, when the application instances 122, 124, 126, 128 implement a database management system, the persistences 130, 132, 134, 136 may store data managed by the database management application. The persistences 130, 132, 134, 136 may be implemented using any suitable data storage device or devices such as, for example, one or more disks, one or more solid state drives, one or more random access memories, etc. In some examples, the software application implemented at the cloud environment 102 is a database management application for an in-memory database such as, for example, the HANA® and S/4 HANA® systems available from SAP SE of Walldorf, Germany.

A persistence 130, 132, 134, 136 may be associated with a user group. In the example of FIG. 1, the persistence 130 is associated with user group 114. The persistence 132 is associated with user group 116. The persistence 134 is associated with the user group 118; and the persistence 136 is associated with the user group 120 and so on. In some examples, a single user group 114, 116, 118, 120 may be associated with more than one persistence. For example, a user group 114, 116, 118, 120 may maintain one persistence for a production implementation of the software application and another persistence for a test or evaluation implementation of the software application.

The application instances 122, 124, 126, 128 include a set of one or more executables, libraries, and/or other components executed within a single container or a limited set of containers implemented at the cloud environment. For example, the application instances 122, 124, 126, 128 may be instances of legacy on-premises applications executing within the cloud-implemented containers. In some examples, instances 122, 124, 126, 128 may be associated with respective persistences 130, 132, 134, 136 as shown. In some examples, containers for executing the various application instances 122, 124, 126, 128 are arranged as Kubernetes® clusters.

The cloud environment 102 also executes one or more services 104, 112 for managing the application instances 122, 124, 126, 128. The services 104, 112 may execute at the cloud environment 102 in one or more containers. A frontend service 112 may interface with the various user groups 114, 116, 118, 120. For example, the frontend service 112 may provide users from various user groups 114, 116, 118, 120 with a user interface to allow the users to manage application instances 122, 124, 126, 128 that are executing and/or to launch new application instances. For example, the frontend service 112 may provide the various user groups 114, 116, 118, 120 with functionality to create, upgrade, delete, and/or otherwise manage application instances 122, 124, 126, 128. In some examples, the frontend service 112 also provides users from the various user groups 114, 116, 118, 120 with data about available target versions to which the user groups' own executing instances 122, 124, 126, 128 can be upgraded, as described herein.

Application orchestration services 104 may manage the execution of the application instances 122, 124, 126, 128. The application orchestration service 104 may be implemented as a single service and/or as a set of one or more subservices. In the example of FIG. 1, the application orchestration services 104 include an application operator service 105 and an application updater service 103. In some examples, the application orchestration services 104 implement a container orchestration system, such as a Kubernetes® container orchestration system.

The application operator service 105 may manage the execution of the one or more containers implementing an application instance 122, 124, 126, 128. For example, the application operator service 105 may begin the execution of one or more containers for implementing an application instance 122, 124, 126, 128, for example, from on one or more container images associated with the one or more containers. Also, if one or more containers associated with an application instance 122, 124, 126, 128 crash, the application operator service 105 may spin up a replacement for the crashed container or containers. The application updater service 103 may manage application versions and update version metadata persistence 106 describing the application.

Version metadata persistence 106 may include metadata describing various different versions of an application. The version metadata persistence 106 may include a product version map 108 and an upgrade strategy map 110. The product version map 108 includes data describing available versions of the application. In some examples, the data describing a version may include release cycle data describing a maturity level of a version. For example, the release cycle data may indicate a level of testing and development to which the version has been subjected. Release cycle data may also indicate a frequency at which new versions are released. For example, a version may represent a monthly release, a bi-weekly release, or any other suitable release period. The product version map 108 may also include track data for one or more versions. The track data may indicate a status or upgrade track of the version and may be associated with a generally-available or production version. For example, the most recently-released quarterly version may be associated with a "latest" track. One or more previously-released versions may be associated with a "maintenance" track indicating that the version is not the latest but is still maintained.

An example product version map 108 is given by EXAMPLE 1 below:

Example 1

```
apiVersion: feature.example.com/v1alpha1
kind: ProductVersion
metadata:
   name: APPLICATION 1
spec:
   enablement:
      rolloutstrategy: staged-APP1-rollout
   versions:
   -      id: <some-unique-id>
          name: APP1 Cloud Edition 2019.38
          releaseCycle: evaluation
          image: some.container.registry/APP1-k8s:4.38.0
   -      id: <some-unique-id>
          name: APP1 Cloud Edition 2019.36
          releaseCycle: early-adoption
          image: some.container.registry/APP1-k8s:4.36.0
          expiration-date: "2029-11-30"
   -      id: <some-unique-id>
          name: APP1 Cloud Edition 2019.32
          releaseCycle: generally-available-quarterly
          track: latest
          image: some.container.registry/APP1-k8s:4.32.0
          expiration-date: "2019-11-02"
   -      id: <some-unique-id>
          name: APP1 Cloud Edition 2019.34
          releaseCycle: generally-available-biweekly
          image: some.container.registry/APP1-k8s:4.34.0
          expiration-date: "2019-04-02"
   -      id: <some-unique-id>
          name: APP1 Cloud Edition 2019.26
          releaseCycle: generally-available-quarterly
          track: maintenance
          image: some.container.registry/APP1-k8s:4.26.0
          expiration-date: "2019-09-21"
```

EXAMPLE 1 shows an example product version map 108 for an application called APPLICATION 1. The example product version map 108 shown in EXAMPLE 1 may represent the entirety of a product version map and/or may be a version map record for APPLICATION 1 retrieved from a product version map having product version map records for multiple different applications. The example product version map 108 indicates that APPLICATION 1 is subject to a staged rollout. The example product version map 108 also indicates five example versions called APP1 Cloud Edition 2019.38, 2019.36, 2019.32, 2019.34, and 2019.26. In EXAMPLE 1, each version is further described by a unique identifier, a release cycle, and an expiration date.

The release cycle indicated for each version describes a maturity level of the version. For example, the version APP1 Cloud Edition 2019.38 is indicated to be an "evaluation" version. An evaluation version may be at a maturity level that is suitable for an early stage of testing and evaluation, such as may be performed by user groups 114, 116, 118, 120 that are internal QA or testing groups. The version APP1 Cloud Edition 2019.36 is indicated to be an "early-adoption" version. An early adoption version may be at a maturity level that is suitable for user groups 114, 116, 118, 120 who may desire to receive early or pre-release versions of the application, for example, for evaluation or testing. The versions APP1 Cloud Edition 2019.32 and 2019.26 are indicated to be "generally-available-quarterly" versions. This indicates versions at a maturity level that is tested and ready for general use. The "generally-available-quarterly" maturity level may indicate a release cycle of the application that includes a new generally-available version each quarter. The version APP1 Cloud Edition 2019.34 is indicated to be "generally-available-biweekly." This indicates that the version is at a maturity level that is tested and ready for general use, although this version is released on a biweekly release schedule providing a new version every two weeks.

The product version map of EXAMPLE 1 also indicates tracks for APP1 Cloud Edition 2019.32 and 2019.26, the two versions that have a maturity level indicating that they are generally available on a quarterly basis. For example, the upgrade track of version 2019.32 is "latest" while the upgrade track of version 2019.26 is labeled "maintenance." For example, version 2019.26 may be a quarterly release from a previous quarter that is not the latest, but is still maintained.

Version metadata persistence 106 may also include an upgrade strategy map 110. The upgrade strategy map 110 describes allowable upgrades from various versions of the application. For example, the upgrade strategy map 110 may comprise upgrade strategy records, where each upgrade strategy record indicates a source version of the application and one or more target versions (if any) to which the source version may be upgraded. An example upgrade strategy map 110 is given by EXAMPLE 2 below:

Example 2

```
apiVersion: feature.example.com/v1alpha1
kind: UpgradeStrategy
metadata:
    name: staged-APPLICATION 1-rollout-upgrades
    labels:
        feature.example.com/productVersion: APP1
spec:
    upgrades:
    - source:
              selector:
                  releaseCycle: generally-available-quarterly
                  track: maintenance
      targets:
          -   name: patch
              selector:
                  releaseCycle: generally-available-quarterly
                  track: maintenance
          -   name: upgrade-to-latest-quarterly
              selector:
                  releaseCycle: generally-available-quarterly
                  track: latest
          -   name: upgrade-to-biweekly
              selector:
                  releaseCycle: generally-available-biweekly
          -   name: upgrade-to-early-adoption
              selector:
                  releaseCycle: early-adoption
          -   name: upgrade-to-evaluation
              selector:
                  releaseCycle: evaluation
    - source:
              selector:
                  releaseCycle: generally-available-quarterly
                  track: latest
      targets:
          -   name: patch
              selector:
                  releaseCycle: generally-available-quarterly
                  track: latest
          -   name: upgrade-to-biweekly
              selector:
                  releaseCycle: generally-available-biweekly
          -   name: upgrade-to-early-adoption
              selector:
                  releaseCycle: early-adoption
          -   name: upgrade-to-evaluation
              selector:
                  releaseCycle: evaluation
    - source:
              selector:
                  releaseCycle: generally-available-biweekly
      targets:
          -   name: patch
              selector:
                  releaseCycle: generally-available-biweekly
          -   name: switch-to-qrc
              selector:
                  releaseCycle: generally-available-quarterly
          -   name: upgrade-to-early-adoption
              selector:
                  releaseCycle: early-adoption
          -   name: upgrade-to-evaluation
              selector:
                  releaseCycle: evaluation
    - source:
              selector:
                  releaseCycle: early-adoption
      targets:
          -   name: patch
              selector:
                  releaseCycle: early-adoption
          -   name: upgrade-to-evaluation
              selector:
                  releaseCycle: evaluation
    - source:
              selector:
                  releaseCycle: evaluation
      targets:
          -   name: patch
              selector:
                  releaseCycle: evaluation
```

EXAMPLE 2 includes a number of example upgrade strategy records for the example Application 1. Each upgrade strategy record indicates a source version and a set of one or more target versions to which the source version can be upgraded. In this example, source versions are indicated by maturity level given by the release cycle and upgrade track (if applicable). Also, in EXAMPLE 2, target versions are identified by a name, indicating the type of upgrade to that target version, and by the maturity level and upgrade track, if applicable, of the referenced version.

Consider the first upgrade strategy record in EXAMPLE 2. The source version is identified by a release cycle "generally-available-quarterly" and a track, "maintenance." As applied to the product version map 108 of EXAMPLE 1, this would refer to APP1 Cloud Edition 2019.26. A "patch" upgrade would upgrade to a target version that is the "generally-available-quarterly" version also on the "maintenance" track. An "upgrade-to-latest-quarterly" upgrade would upgrade to a target version that is the "generally-available-quarterly" version on the "latest" track. An "upgrade-to-biweekly" upgrade would change to the "generally-available-biweekly" version. An "upgrade-to-early-adoption" change would upgrade to the "early-adoption" version. An "upgrade-to-evaluation" change would upgrade to the "evaluation version."

In some examples, the application orchestration service 104 (e.g., via the application updater service 103 and/or application operator service 105) reads the version metadata persistence 106 and prepares application instances 122, 124, 126, 128 for upgrading. For example, the application orchestration service 104 (e.g., via the application operator service 105) may utilize the product version map 108 and upgrade strategy map 110 to determine the available upgrades for the various application instances 122, 124, 126, 128. This may include determining the version and/or maturity level and upgrade track (if any) of an application instance 122, 124, 126, 128 and then determining, from the upgrade strategy map 110, any upgrades that are available from that maturity level and upgrade track (if any).

The application orchestration service 104 (e.g., application operator service 105) may then consult the product version map 108 to determine the linked container images and version numbers associated with the target versions of each available upgrade. These may be written to a location accessible to the application orchestration service 104 (e.g., the application updater service 103 thereof), which may utilize the indicated target versions to respond to an upgrade request from a user group 114, 116, 118, 120. When an upgrade request is received, the application orchestration service 104 (e.g., the application updater service 103) may spin up a new version of the requested target version.

In some examples, instead of pre-figuring the target versions from a particular application instance 122, 124, 126, 128, the application orchestration service (e.g., the application operator service 105) may consult the version metadata persistence 106 to determine available upgrades and target versions upon receiving a request for an upgrade from a user group 114, 116, 118, 120. The arrangement 100 of FIG. 1 also includes a deployment service 138. The deployment service 138 may execute at one or more computing devices, such as computing devices implemented by the cloud service provider that implements the cloud environment 102. In some examples, the deployment service 138 is executed at the same computing devices that implement the environment 102. The deployment service 138 may be programmed to launch the cloud environment 102, for example, as part of a CI/CD pipeline. In some examples, the deployment service 138 may also be used to update the version metadata persistence 106, for example, as described herein. For example, the CI/CD pipeline may be used to generate new versions, patches, etc. for the application instances 122, 124, 126, 128. When the deployment service 138 deploys new version, patch, upgrade, or the like, it may also make appropriate upgrades to the version metadata persistence 106.

Figure 2:
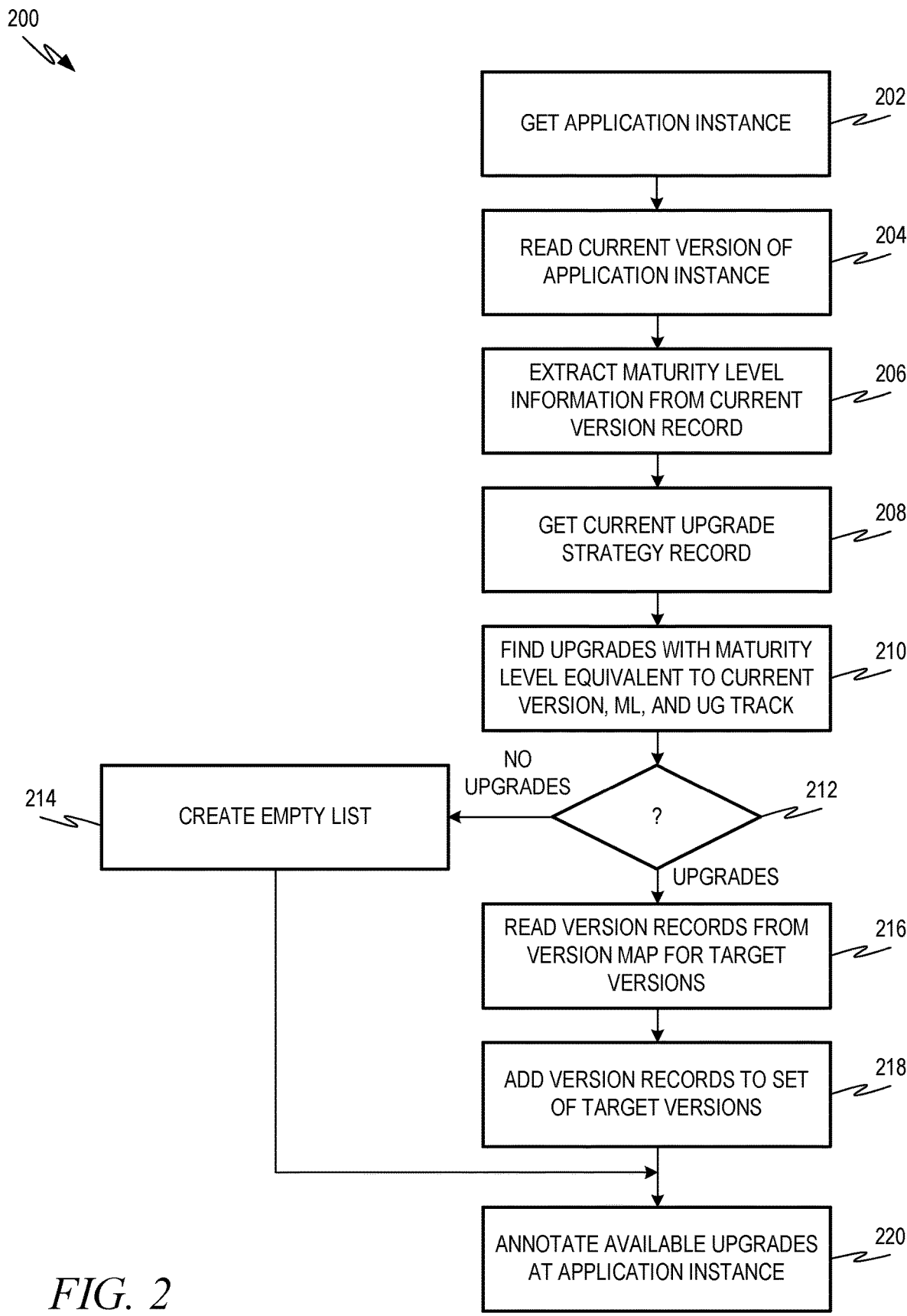
FIG. 2 is a flowchart showing one example of a process flow that may be executed in the environment of FIG. 1 to determine upgrades available for a given application instance.

FIG. 2 is a flowchart showing one example of a process flow 200 that may be executed by the application orchestration service 104 (e.g., the application operator service 105) to determine upgrades available for a given application instance 122, 124, 126, 128. At operation 202, the application orchestration service 104 receives an indication of an application instance 122, 124, 126, 128. At operation 204, the application orchestration service 104 determines the current version of the application instance 122, 124, 126, 128. At operation 206, the application orchestration service 104 determines the maturity level of the application instance 122, 124, 126, 128. This may include, for example, using a version name and/or number to pull a product version record for the version from the product version map 108. The product version record may provide release cycle and/or upgrade track data for the application instance 122, 124, 126, 128.

At operation 208, the application orchestration service 104 retrieves the current upgrade strategy record for the application instance 122, 124, 126, 128. This may involve, for example, identifying the upgrade strategy record at the upgrade strategy map 110 that lists the current version and/or maturity level of the application instance 122, 124, 126, 128 as the source version. At operation 210, the application orchestration service 104 determines upgrades that are available to the application instance 122, 124, 126, 128. If any upgrades are available at operation 212, the application orchestration service 104, at operation 216, reads the version records for the indicated target versions from the product version map 108. For example, as illustrated with EXAMPLES 1 and 2 above, the upgrade strategy record for a source version may indicate the maturity level of target versions. The application orchestration service 104 may utilize the product version map to find the version number, docker image(s), etc., associated with the indicated maturity level. The version records may be added to a set of target versions at operation 218.

At operation 220, the application orchestration service 104 annotates the application instance 122, 124, 126, 128 to include the available upgrades including, for example, the target versions. The annotation can be made at any suitable location including, for example, at a persistence available to the application orchestration service 104 and the frontend service 112, and/or at a metadata store associated with the application instance 122, 124, 126, 128.

Referring back to operations 210 and 212, if the retrieved upgrade strategy record does not indicate any available upgrades for the application instance 122, 124, 126, 128, the application orchestration service 104 may create an empty list of available upgrades at operation 214 to indicate that no upgrades are available. Optionally, the empty list of available upgrades is annotated at operation 220 as described herein. In some examples, rather than creating an annotation of an application instance 122, 124, 126, 128, the application orchestration service 104 may execute the process flow 200 in response to a request for available upgrades from the frontend service 112. For example, instead of annotating the available upgrades at operation 220, the application orchestration service 104 may send a response to the frontend service 112 indicating the available upgrades.

Figure 3:
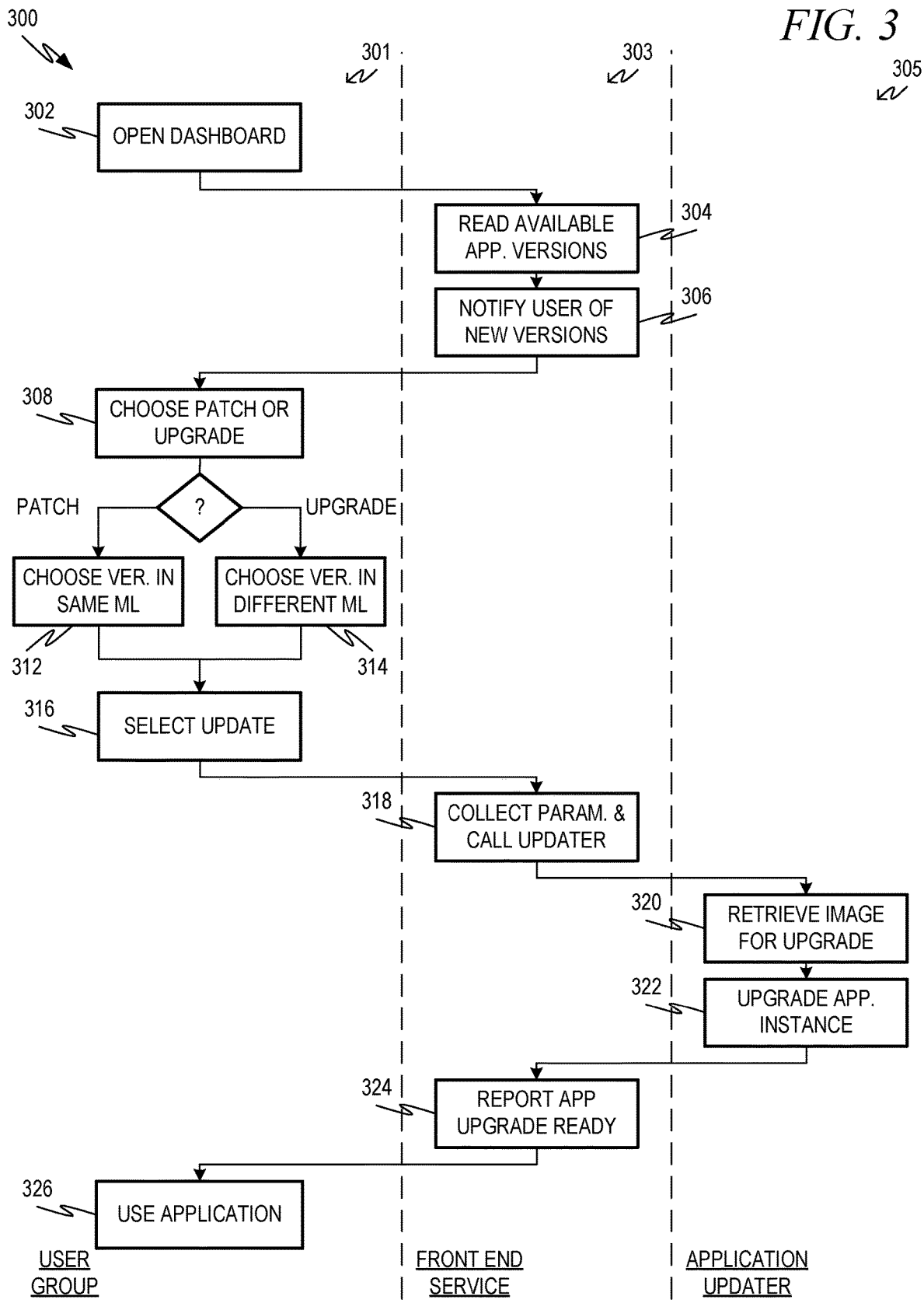
FIG. 3 is a flowchart showing one example of a process flow that may be executed in the environment of FIG. 1 to implement an upgrade of an application instance.

FIG. 3 is a flowchart showing one example of a process flow 300 that may be executed in the arrangement 100 to implement an upgrade of an application instance. The process flow 300 includes three columns 301, 303, 305 with each column including operations that may be executed by a different component of the arrangement 100. The column 301 includes operations that can be performed by a user group 114, 116, 118, 120 or, for example, a single user authorized to make changes on behalf of the user group 114, 116, 118, 120. The column 303 includes operations executed by the frontend service 112. The column 305 includes operations performed by the application orchestration service 104, such as by the application updater service 103.

At operation 302, the user group 114, 116, 118, 120 opens an application dashboard. The application dashboard may be any suitable user interface element provided to the user group 114, 116, 118, 120 by the frontend service 112. At operation 304, the frontend service 112 reads available application versions. The available application versions are based on the version of the application instance 122, 124, 126, 128 executing for the corresponding user group 114, 116, 118, 120. The available application versions, for example, may have been previously annotated by the application orchestration service 104 as described with respect to the process flow 200 of FIG. 2. Also, in some examples, the frontend service 112 directs a request for available versions to the application orchestration service 104, which may respond by providing the requested list of available versions.

At operation 306, the frontend service 112 notifies the user group of the available new versions. This may include, for example, generating a list of the available new versions that is provided to the user group 114, 116, 118, 120 via the dashboard UI element. At operation 308, the user group 114, 116, 118, 120 choses a patch or upgrade. For example, a patch may be a change to an application version that has the same maturity level as the current version of the application instance 122, 124, 126, 128 (e.g., the release cycle and/or upgrade track). An upgrade may be a change to an application version having a different maturity level than the current version of the application instance 122, 124, 126, 128 (e.g., a different release cycle and/or upgrade track). It will be appreciated that it may not be the case that both a patch and an upgrade are available in every circumstance. Sometimes, only one or more patches will be available. Sometimes only one or more upgrades will be available. In some examples, neither a patch nor an upgrade will be available.

If the user group 114, 116, 118, 120 selects a patch, then the user group 114, 116, 118, 120 selects a target version in the same maturity level as the source version or current version at operation 312. If the user group 114, 116, 118, 120 selects an upgrade, then, at 314, the user group 114, 116, 118, 120 chooses a version in a different maturity level than the current version of the application. At operation 316, the selected update or patch is provided to the frontend service 112. At operation 318, the frontend service 112 collects parameters for the selected update and calls the application orchestration service 104 (e.g., the application updater service 103). The collected parameters may include, for example, an indication of the user group 114, 116, 118, 120 making the request, an indication of the current instance 122, 124, 126, 128 of the application for that user group 114, 116, 118, 120 including, for example, a version of the instance, and an indication of the selected target version.

The application orchestration service 104 (e.g., the application updater service 103), at operation 320, retrieves one or more container images for launching the target version referred to at the product version map 108. The one or more container images may be Docker® images or other suitable images describing containers to be executed at the cloud environment 102 to implement the selected target version. Each container may include one or more executables and/or libraries that execute within the container to implement an instance of the application version.

In some examples, a selected target version may be associated with more than one container image. The orchestration service 104 may retrieve a container image or images based on selections made by the user group 114, 116, 118, 120. For example, a selected target version may be executed with different containers or different combinations of containers based on the application features desired by the relevant user group 114, 116, 118, 120.

At operation 322, the application orchestration service 104 (e.g., the application updater service 103) upgrades the application instance. Upgrading the application instance may include, for example, spinning up one or more containers based on the retrieved container image or images to generate a new application instance for the requesting user group 114, 116, 118, 120. In some examples, upgrading the application instance may also include executing a data migration at a persistence 130, 132, 134, 136 of the requesting user group 114, 116, 118, 120. For example, the persistence 130, 132, 134, 136 or a portion thereof may be modified from a prior schema to a target schema used by the target version. In some examples, upgrading the application instance may also include stopping the execution of a container associated with a previous instance of the application used by the requesting user group 114, 116, 118, 120.

At operation 324, the frontend service reports to the user group 114, 116, 118, 120 that the new instance of the application is ready for use. The user group 114, 116, 118, 120 may commence to use the new instance of the application at operation 326.

Figure 4:
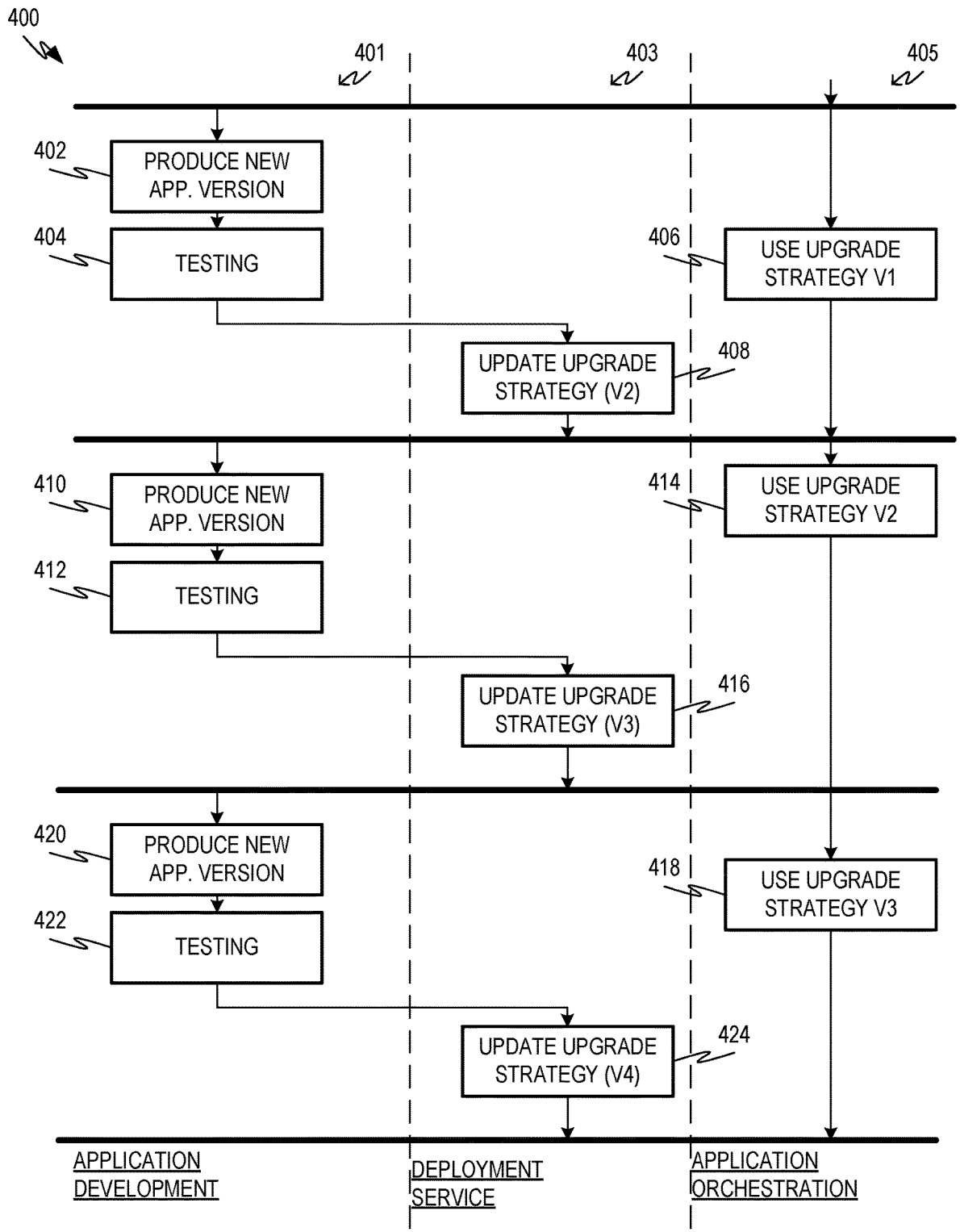
FIG. 4 is a flowchart showing one example of a process flow that may be executed in the environment of FIG. 1 to generate and deploy new application versions.

FIG. 4 is a flowchart showing one example of a process flow 400 that may be executed in the environment of FIG. 1 to generate and deploy new application versions. The process flow 400 includes three columns. A first column 401 shows operations that may be performed by an application development team. The application development team may be a user group such as, for example, a user group 114, 116, 118, 120, made up of developers, testing users, and the like. Column 403 shows operations that may be performed by a deployment service, such as the deployment service 138. The column 405 shows operations that are executed by the application orchestration service 104 and/or a subservice thereof.

At operation 402, the application development team produces a new version of the application. The new version of the application may be arranged to execute at the cloud environment 102 in one or more containers, as described herein. At operation 404, the application development team performs and/or supervises testing of the new version of the application. At operation 408, the deployment service updates the upgrade strategy map at the cloud environment 102 in view of the new version. In some examples, this includes including the new version as an allowable target version for one or more source versions. While operations 402, 404, and 408 are being executed, the application orchestration service 104 may continue, at operation 406, to perform upgrades to application instances 122, 124, 126, 128 using first version (V1) of the upgrade strategy map 110. After the upgrade strategy map 110 is updated at operation 408, the orchestration service 104 may, at operation 414, begin to use a second version (V2) of the upgrade strategy map 110, the second version being created by the update at operation 408.

In some examples, the changeover from V1 to V2 is transparent to the application orchestration service 104. For example, the application orchestration service 104 may operate based on the version metadata persistence 106 installed at the cloud environment 102. When the version metadata persistence 106 is modifies, such as the change to the upgrade strategy map at operation 408, the application orchestration service 104 may continue to operate, albeit based on the upgraded version metadata.

At operation 410, the application development team produces a second new version of the application. At operation 412, the application development team performs and/or supervises testing of the second new version of the application. At operation 416, the deployment service updates the upgrade strategy map 110 at the cloud environment 102 in view of the second new version. In some examples, this includes including the second new version as an allowable target version for one or more source versions. While operations 410, 412, and 414 are being executed, the application orchestration service 104 may continue to perform upgrades to application instances 122, 124, 126, 128 using V2 of the upgrade strategy map 110. After the upgrade strategy map is updated at operation 416, the orchestration service 104 may, at operation 418, begin to use a third version (V3) of the upgrade strategy map 110, the third version being created by the update at operation 416.

At operation 420, the application development team produces a third new version of the application. At operation 422, the application development team performs and/or supervises testing of the third new version of the application. At operation 424, the deployment service updates the upgrade strategy map 110 at the cloud environment 102 in view of the third new version. In some examples, this includes including the third new version as an allowable target version for one or more source versions. While operations 420, 422, and 424 are being executed, the application orchestration service 104 may continue to perform upgrades to application instances 122, 124, 126, 128 using V2 of the upgrade strategy map 110. After the upgrade strategy map is updated at operation 416, the orchestration service 104 may begin to use a fourth version (V4) of the upgrade strategy map 110, the fourth version being created by the update at operation 424. This process may continue as additional versions are produced by the application development team.

Figure 5:
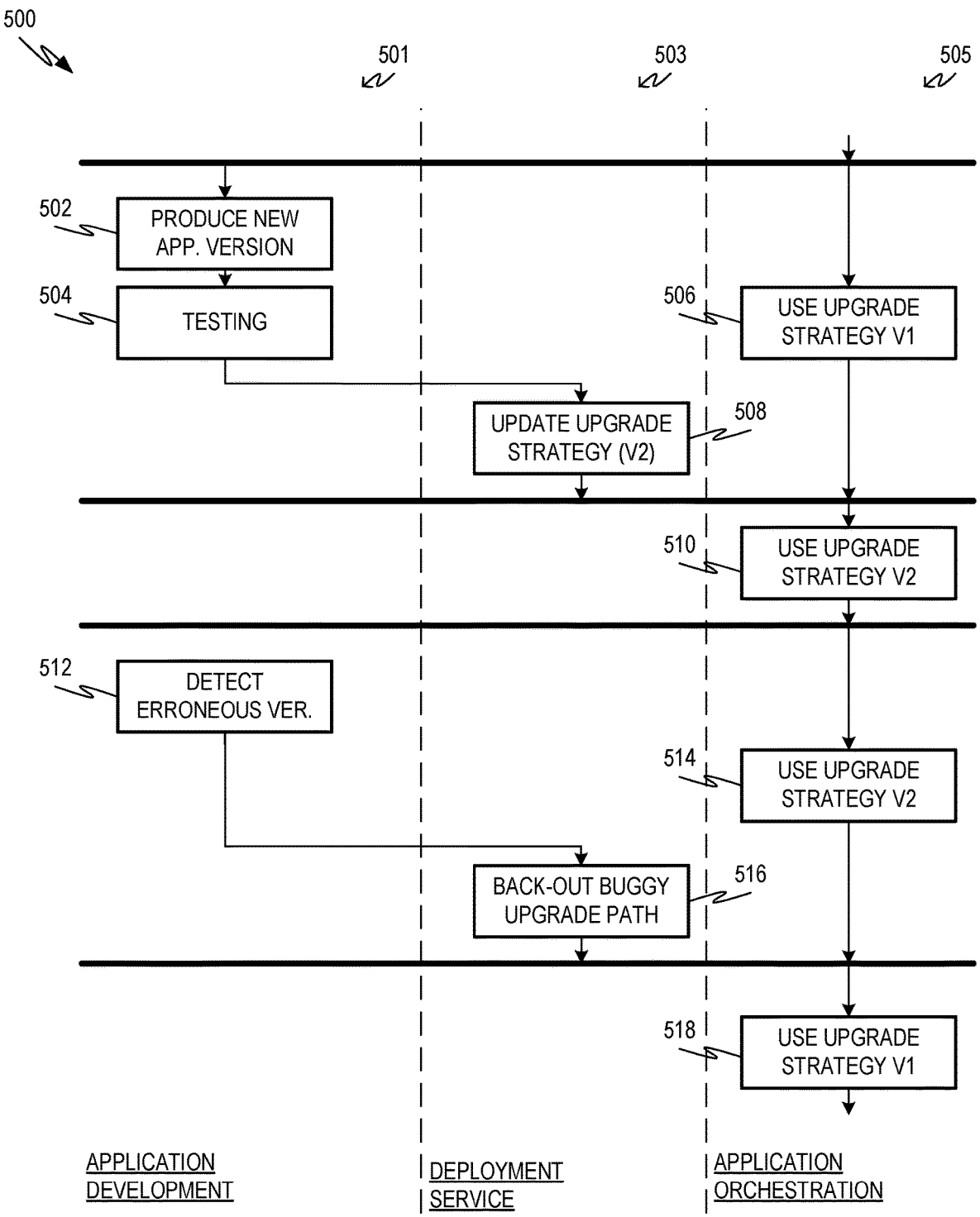
FIG. 5 is a flowchart showing one example of a process flow that may be executed in the environment of FIG. 1 to back-out a previously-generated application version.

FIG. 5 is a flowchart showing one example of a process flow 500 that may be executed in the environment of FIG. 1 to back-out a previously-generated application version. A first column 501 shows operations that may be performed by an application development team such as, for example, a user group 114, 116, 118, 120 made up of developers, testing users, and the like. Column 503 shows operations that may be performed by a deployment service, such as the deployment service 138. The column 505 shows operations that are executed by that application orchestration service 104 and/or a subservice thereof.

At operation 502, the application development team produces a new version of the application. The new version of the application may be arranged to execute at the cloud environment 102 in one or more containers, as described herein. At operation 504, the application development team performs and/or supervises testing of the new version of the application. At operation 508, the deployment service updates the upgrade strategy map at the cloud environment 102 in view of the new version. In some examples, this includes including the new version as an allowable target version for one or more source versions. While operations 502, 504, and 508 are being executed, the application orchestration service 104 may continue, at operation 506, to perform upgrades to application instances 122, 124, 126, 128 using first version (V1) of the upgrade strategy map 110. After the upgrade strategy map is updated at operation 508, the orchestration service 104 may, at operation 510, begin to use a second version (V2) of the upgrade strategy map 110, the second version being created by the update at operation 508.

At operation 512, the application development team detects that the new version of the application is erroneous. For example, the new version may have a QA issue, such as a reported error or other problem with the execution of or other aspect of the new version. In response, at operation 516, the buggy upgrade path to the new version is backed out of the version metadata persistence 106 at the cloud environment 102, for example, using the deployment service 138. This may include, for example, deleting one or more references to the new version of the application as allowable target versions at the upgrade strategy map 110 at the environment 102. The result of operation 516 may be a third version of the upgrade strategy map 110 at the environment 102 (V3) that does not include a reference to the buggy new version as a permitted target version. While operations 512 and 516 are being executed, the application orchestration service 104 may continue, at operation 514, to use the second version of the upgrade strategy map 110 for generating allowable upgrades and/or performing the upgrades. After the execution of operation 516, the application orchestration service 104 may begin, at operation 518, to use the third version of the upgrade strategy map 110.

In some examples, it may be desirable to selectively expose some versions of an application to different user groups. Consider an example user group that includes users who are part of a QA department within the entity providing the application. It may be desirable to expose alpha, beta, and/or other early testing versions of an application to the example user group and not to other user groups, such as user groups associated with customer entities. Consider another example user group associated with a premium customer of the entity generating the application. It may be desirable to expose beta and/or other evaluation versions of the application to this example user group without exposing those versions to all customers.

Selectively providing different versions of a legacy on-premises application to different users from a cloud environment may present challenges. For example, as described herein, it may be desirable for application orchestration services at the cloud environment to be independent of application versions so that application versions can be changed without requiring changes to the orchestration services. Similarly, it may be desirable to modify the versions of a legacy on-premises application available to different user groups without making changes to the orchestration services themselves.

Various examples address these and other challenges utilizing a version catalog and rollout strategy map. The rollout strategy map comprises rollout records, where each rollout record describes an application version and selector data. The selector data describes user groups that are authorized to use the corresponding application version. The version catalog may include a reference to the rollout strategy map.

Figure 6:
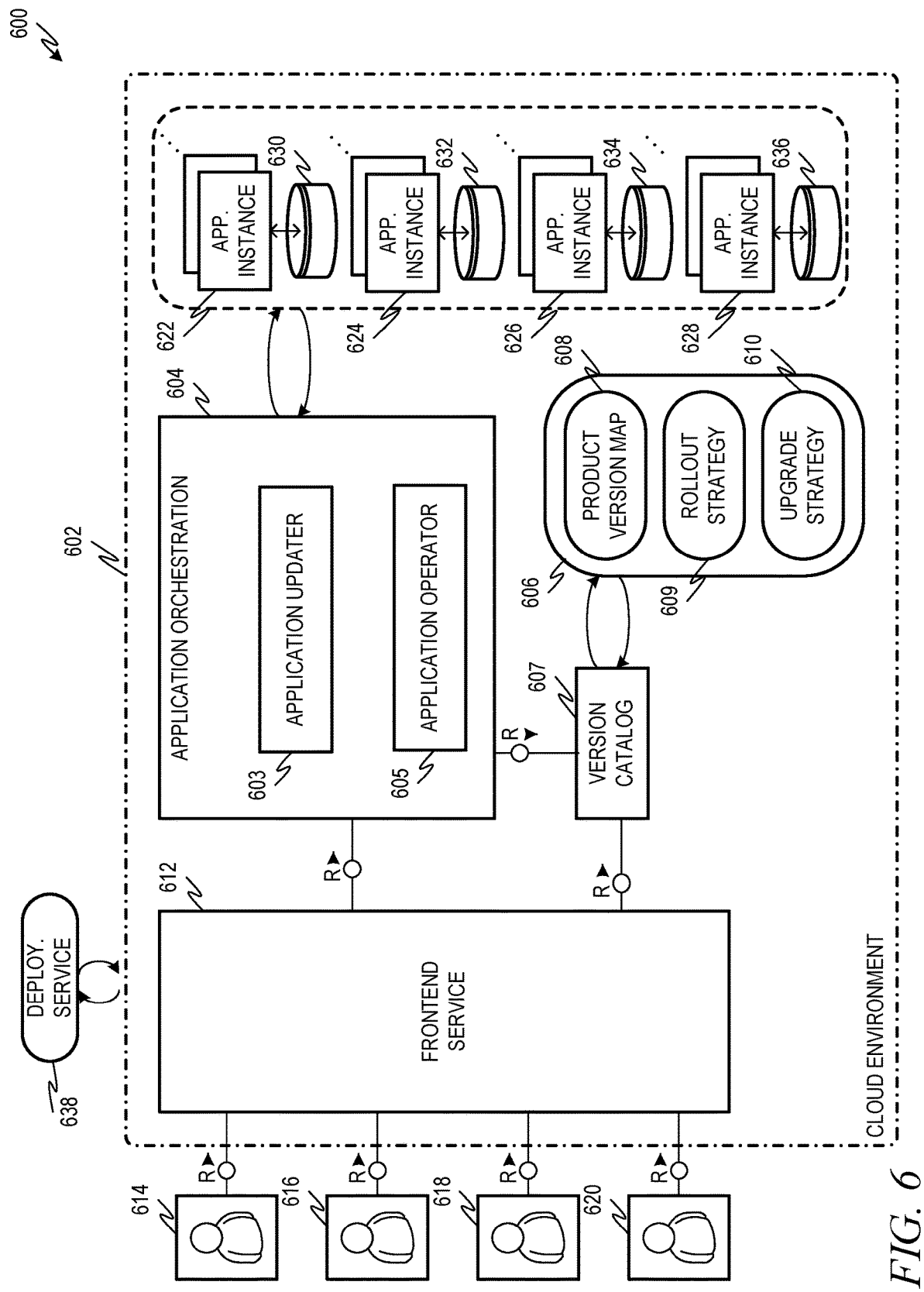
FIG. 6 is a diagram showing one example of an environment for providing versions of a legacy on-premises software application in a cloud environment.

FIG. 6 is a diagram showing one example of an arrangement 600 for providing versions of a legacy on-premises software application in a cloud environment 602. The cloud environment 602 executes one or more application instances 622, 624, 626, 628 and various services 612, 604 to provide an application, such as a database management application, to one or more user groups 614, 616, 618, 620.

The cloud environment 602 may include one or more computing devices, such as servers, for executing the application instances 622, 624, 626, 628 and services 612, 604. In some examples, the cloud environment 602 is one of a number of cloud environments implemented by a cloud service provider at different geographic locations. For example, the cloud environment 602 may be implemented at a data center or data centers geographically near to the user groups 614, 616, 618, 620 so as to minimize network latencies to the user groups 614, 616, 618, 620. Other cloud environments similar to the cloud environment 602 may be implemented at data centers geographically near to other user groups to provide the application to those user groups.

User groups 614, 616, 618, 620 indicate groups of one or more users who use applications instances 622, 624, 626, 628 at the cloud environment 602. Each user group 614, 616, 618, 620, in some examples, is associated with a stakeholder. Stakeholders may be internal stakeholders of an entity providing the software application such as, for example, QA or testing groups. Stakeholders may also include customer entities who purchase access to the software application.

User groups 614, 616, 618, 620 may be associated with one or more application instances 622, 624, 626, 628. For example, the user group 614 may be associated with application instance 622. The user group 616 may be associated with the application instance 624. The user group 618 may be associated with application instance 626. The user group 620 may be associated with application instance 628, and so on. In some examples, a user group 614, 616, 618, 620 may be associated with more than one instance of the application. For example, a user group 614, 616, 618, 620 may execute an instance of the application for a production implementation and another instance or instances of the application for a testing or evaluation use.

The cloud environment 602 also implements persistences 630, 632, 634, 636. For examples, when the application instances 622, 624, 626, 628 implement a database management system, the persistences 630, 632, 634, 636 may store data managed by the database management application. The persistences 630, 632, 634, 636 may be implemented using any suitable data storage device or devices such as, for example, one or more disks, one or more solid state drives, one or more random access memories, etc. In some examples, the software application implemented at the cloud environment 602 is a database management application for an in-memory database such as, for example, the HANA® and S/4 HANA® systems available from SAP SE of Walldorf, Germany.

A persistence 630, 632, 634, 636 may be associated with a user group. In the example of FIG. 6, the persistence 630 is associated with user group 614. The persistence 632 is associated with user group 616. The persistence 634 is associated with the user group 618; and the persistence 636 is associated with the user group 620 and so on. In some examples, a single user group 614, 616, 618, 620 may be associated with more than one persistence. For example, a user group 614, 616, 618, 620 may maintain one persistence for a production implementation of the software application and another persistence for a test or evaluation implementation of the software application.

The software application provided by the cloud environment 602 of FIG. 6 may be a legacy on-premises application converted for provision by the cloud environment 602. For example, the application may execute as various instances 622, 624, 626, 628. Each application instance may comprise one or more containers including executables, libraries, and/or other components for providing the software application. In some examples, instances 622, 624, 626, 628 may be associated with respective persistences 630, 632, 634, 636 as shown. In some examples, containers for executing the various application instances 622, 624, 626, 628 are arranged as Kubernetes® clusters.

The cloud environment 602 also executes one or more services 604, 612 for managing execution of the application instances 622, 624, 626, 628. The services 604, 612 may execute at the cloud environment 602 in one or more containers. A frontend service 612 may interface with the various user groups 614, 616, 618, 620. For example, the frontend service 612 may provide users from various user groups 614, 616, 618, 620 with a user interface to allow the users to access application instances 622, 624, 626, 628 that are executing and/or to launch new application instances. In some examples, the frontend service 612 provides users from the various user groups 614, 616, 618, 620 with data about available target versions to which the user groups' own executing instances 622, 624, 626, 628 can be upgraded, as described herein.

Application orchestration services 604 may manage the execution of the application instances 622, 624, 626, 628. The application orchestration service 604 may be implemented as a single service and/or as a set of one or more subservices. In the example of FIG. 6, the application orchestration services 604 include an application operator service 605 and an application updater service 603.

The application operator service 605 may manage the execution of the one or more containers implementing an application instance 622, 624, 626, 628. For example, the application operator service 605 may begin the execution of one or more containers for implementing an application instance 622, 624, 626, 628, for example, from on one or more container images associated with the one or more containers. Also, if one or more containers associated with an application instance 622, 624, 626, 628 crash, the application operator service 605 may spin up a replacement for the crashed container or containers. The application updater service 603 may manage application versions.

In the example of FIG. 6, the version metadata persistence 606 includes a product version map 608, an upgrade strategy map 610 and a rollout strategy map 609. The product version map 608 and upgrade strategy map 610 may be similar to the product version map 108 and upgrade strategy map 110 described herein with respect to FIG. 1. The rollout strategy map 609 may include rollout records, with each rollout record describing a version of the application and selector data, where the selector data describes user group context properties describing user groups that are permitted to use the indicated application version.

The arrangement 600 also includes a version catalog service 607. The version catalog service 607 may be used by the application orchestration service 104 and/or the frontend service 612 to access the version metadata persistence 606. For example, the version catalog service 607 may utilize the product version map 608, rollout strategy map 609, and/or upgrade strategy map 110 to generate lists of permissible versions for some or all of the user groups 614, 616, 618, 620. A list of permissible versions for a user group 614, 616, 618, 620 indicates versions of the application that are both available and that the corresponding user group 614, 616, 618, 620 is authorized to use. The version catalog service 607 may generate and/or update a list of permissible versions for a user group 614, 616, 618, 620, for example, upon a request from a user group 614, 616, 618, 620 to initiate and/or upgrade an application instances 622, 624, 626, 628 and/or periodically.

In some examples, the application orchestration service 604 may request that the version catalog service 607 utilize the rollout strategy map 609 in conjunction with the upgrade strategy map 610. For example, the list of permissible versions for a user group 614, 616, 618, 620 at the version catalog service 607 may include versions that the user group 614, 616, 618, 620 is permitted to use, as indicated by the rollout strategy map 609 and that are permissible upgrades from the current version of an application instance 622, 624, 626, 628 for the user group 614, 616, 618, 620.

An example rollout strategy map 609 is provided by EXAMPLE 3 below. The example rollout strategy map 609 provided by EXAMPLE 3 below may be used in conjunction with the example product version map given by EXAMPLE 1 herein and/or with the example upgrade strategy map 610 given by EXAMPLE 2 herein.

Example 3

```
apiVersion: feature.example.com/v1alpha1
kind: RolloutStrategy
metadata:
    name: staged-APP1-rollout
    labels:
            feature.example.com/productVersion: APP1
spec:
    default:
            versionSelector:
                releaseCycle: generally-available-quarterly
                track: qrc4
```

```
rollouts:
-       name: QRC
        selector:
            releaseCycle: generally-available-quarterly
            track: qrc3
        versionSelector:
            releaseCycle: generally-available-quarterly
            track: qrc3
-       name: biweekly
        selector:
            releaseCycle: biweekly
        versionSelector:
            releaseCycle: generally-available-biweekly
```

The name of the rollout strategy map example of EXAMPLE 3 is "staged-APP1-rollout." For example, this rollout strategy map example was referred to in the product version map of EXAMPLE 1 above. The example rollout strategy map of EXAMPLE 3 includes three rollout records. A first default rollout record called "default" indicates a default version of APPLICATION 1 that is to be available, which is the "generally-available-quarterly" version on track quarterly release cycle (QRC 3). The first rollout record does not indicate any selector data, for example, because the indicated version is the default version that is available.

Other example rollout records indicated by EXAMPLE 3 include a rollout record named QRC and a rollout record named "biweekly." The QRC rollout record is associated with selector data indicating a release cycle—"generally-available-quarterly" and an upgrade track "qrc 3." The record indicates an application version corresponding to the "generally-available-quarterly" release cycle and the qrc3 track, which can be tied to a particular application version at the product version map 608. This rollout record indicates user groups 614, 616, 618, 620 having context properties indicating that the user group 614, 616, 618, 620 is on a "generally-available-quarterly" release cycle and the upgrade track "qrc 3" is authorized to use the indicated version.

The "biweekly" rollout record indicates an application version corresponding to the "generally-available-biweekly" release cycle and selector data indicating the "biweekly" release cycle. Accordingly, user groups 614, 616, 618, 620 having context properties indicating that the user group 614, 616, 618, 620 is on a "biweekly" release cycle are authorized to access the indicated version.

The arrangement 100 of FIG. 6 also includes a deployment service 638. The deployment service 638 may execute at one or more computing devices, such as computing devices implemented by the cloud service provider that implements the cloud environment 602. In some examples, the deployment service 638 is executed at the same computing devices that implement the environment 602. The deployment service 638 may be programmed to launch the cloud environment 602, for example, as part of a CI/CD pipeline. In some examples, the deployment service 638 may also be used to update the version metadata persistence 606, for example, as described herein. For example, the CI/CD pipeline may be used to generate new versions, patches, etc. for the application instances 622, 624, 626, 628. When the deployment service 638 deploys new version, patch, upgrade, or the like, it may also make appropriate upgrades to the version metadata persistence 606.

Figure 7:
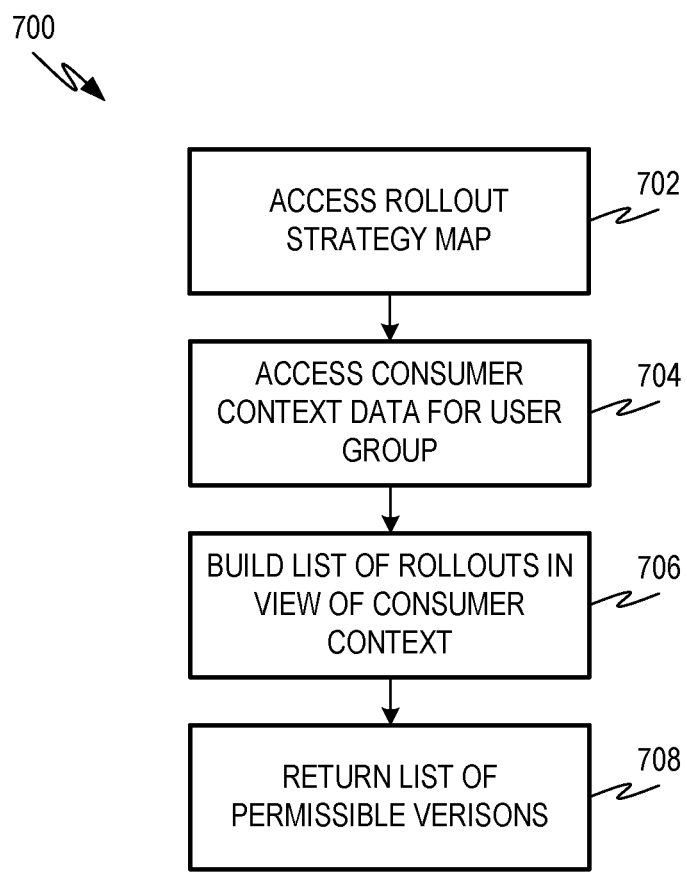
FIG. 7 is a flowchart showing one example of a process flow that may be executed in the environment of FIG. 6 to make a list of permissible versions for a user group.

FIG. 7 is a flowchart showing one example of a process flow 700 that may be executed in the arrangement 600 by version catalog service 607 to make a list of permissible versions for a user group 614, 616, 618. The process flow 700 may be executed in response to a request from a user group 614, 616, 618, 620 (e.g., via the frontend service 612, in response to a request from the application orchestration service 604, periodically, and/or in response to any other suitable criteria.

At operation 702, the version catalog service 607 accesses the rollout strategy map 609. At operation 704, the version catalog service 607 accesses consumer context data for a user group 614, 616, 618, 620. The context data comprises context properties describing the user group 614, 616, 618, 620. The consumer context data can be received from a user associated with the user group 614, 616, 618, 620 as part of a request to initiate and/or upgrade an application instance 622, 624, 626, 628. Also, in some examples, consumer context data for different user groups 614, 616, 618, 620 is archived. The version catalog service 607 may retrieve the consumer context data for a user group 614, 616, 618, 620 from an archive.

Example context properties that may be stored with the consumer context data for a user group 614, 616, 618, 620 include a name of the application provided by the cloud environment 602, a customer account identifier, a customer sub-account identifier, an identifier of the instance 622, 624, 626, 628 of the application currenting executing for the user group 614, 616, 618, 620, an indication of a release cycle for the user group 614, 616, 618, 620, an indication of an upgrade track for the user group 614, 616, 618, 620, and the like.

At operation 706, the version catalog service 607 may build a list of versions of the application that are permissible for the user group 614, 616, 618, 620 in view of the rollout strategy map 609 and product version map 608. The list of permissible versions may be returned at operation 708. Returning the list of permissible versions may include providing the list to the frontend service 612 or other requestor.

Figure 8:
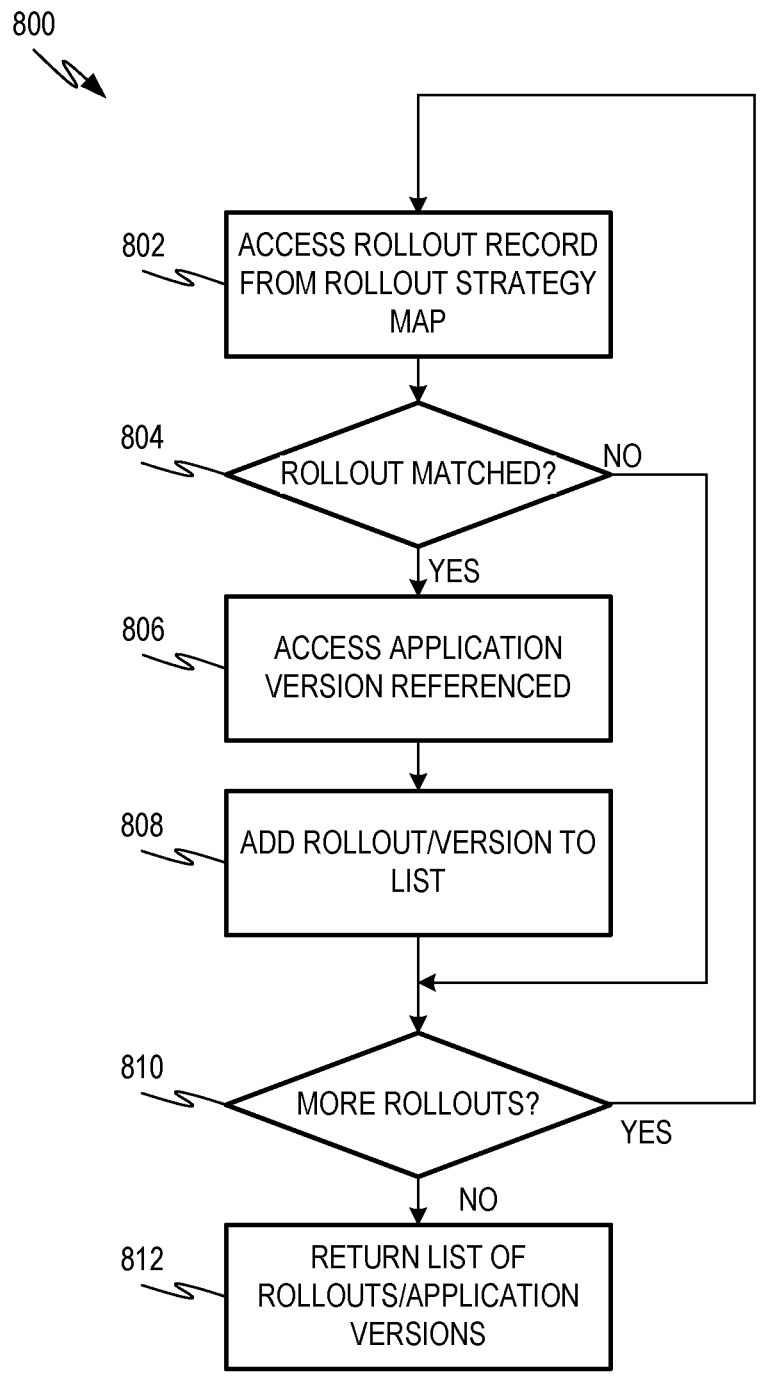
FIG. 8 is a flowchart showing one example of a process flow that may be executed in the environment of FIG. 6 to build the list of permissible versions for a user group using the rollout strategy map and consumer context data.

FIG. 8 is a flowchart showing one example of a process flow 800 that may be executed in the arrangement 600 to build the list of permissible versions for a user group 614, 616, 618, 620 using the rollout strategy map 609 and consumer context data. The process flow 800 shows one example way that the version catalog service 607 can execute the operation 706 of the process flow 700.

At operation 802, the version catalog service 607 accesses a rollout record from the rollout strategy map 609. At operation 804, the version catalog service 607 determines if the consumer context data matches the selector data of the rollout record. In some examples, if the rollout record is a default rollout record for a default version of the application, then operation 804 may be considered to match all consumer context data. If the rollout record is not for a default version of the application, then the operation 804 may include comparing the consumer context properties of the user group 614, 616, 618, 620 to the selector data of the rollout record.

If, at operation 804, the rollout record selector data matches the consumer context data, the version catalog service 607, at operation 806, accesses the application version indicated by the rollout record and, at operation 808, adds the indicated application version to the list of permissible versions for the user group 614, 616, 618, 620. If, at operation 804, the rollout record does not match the consumer context data, then the version catalog service 607 may proceed to operation 810.

After adding the application version to the list of permissible versions at operation 808 or determining, at operation 804, that the rollout record selector data does not match the consumer context data, the version catalog service 607, at operation 810, determines if the rollout strategy map 609 includes any additional rollout records. If there are more rollout records, the version catalog service 607 accesses the next rollout record at operation 802 and proceeds as described herein. If there are no additional rollout records, the version catalog service 607 returns the current list of permissible versions for the user group 614, 616, 618, 620 at operation 812.

Figure 9:
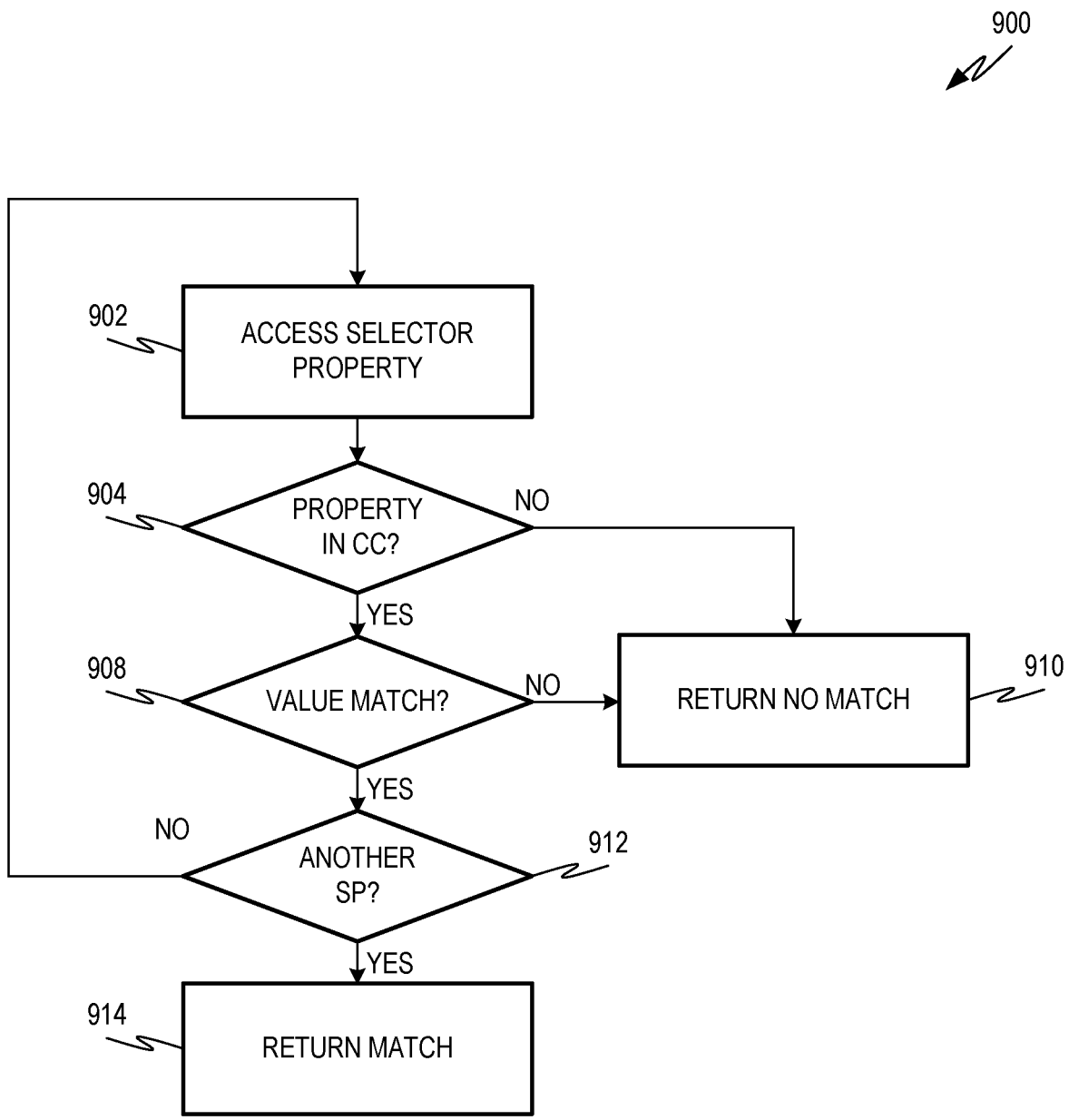
FIG. 9 is a flowchart showing one example of a process flow that may be executed in the environment of FIG. 6 to determine if selector data from a rollout record matches consumer context data for a user group.

FIG. 9 is a flowchart showing one example of a process flow 900 that may be executed in the arrangement 600 to determine if selector data from a rollout record matches consumer context data for a user group 614. For example, the process flow 900 shows one example way that the version catalog service 607 can execute the operation 804 of the process flow 900.

At operation 902, the version catalog service 607 accesses a first selector property from the selector data. At operation 904, the version catalog service 607 determines if the first selector property accessed at operation 902 has a matching property at the consumer context data describing the user group 614, 616, 618, 620. For example, if the rollout selector property is a release cycle, the operation 904 may include determining if the consumer context data includes an indication of a release cycle. If there is no corresponding property in the consumer context data, the version catalog service 607 returns no match between the user group 614, 616, 618, 620 and considered rollout record at operation 910.

If there is a corresponding property in the consumer context data at operation 904, the version catalog service 607 determines at operation 908 whether the value of the corresponding property of the consumer context data has the same value as the first consumer context property. For example, if the first rollout selector property indicates a bi-weekly release cycle, the operation 908 may include determining whether the consumer context data for the corresponding user group 614, 616, 618, 620 also indicates the same the bi-weekly release cycle. If the value of the corresponding property of the consumer context data is not the same value as the first selector property, the version catalog service 607 returns no match between the user group 614, 616, 618, 620 and considered rollout record at operation 910.

If, at operation 908, the value of the corresponding consumer context data property is the same value as the first selector property, the version catalog service 607 determines at operation 912 whether there are any additional selector properties are indicated by the rollout selector data. If there are additional selector properties the version catalog service 607 accesses the next selector property at operation 902 and continues as described.

If all selector properties from the rollout record have been considered, the version catalog service 607 returns an indication that there is a match between the user group 614, 616, 618, 620 and considered rollout record at operation 914.

The example process flow 900 implements a logic that returns a match between the consumer context data for a user group 614 and selector data from a rollout record when all properties that are included in both the rollout selector and the consumer context data have equivalent values and all properties in the rollout selector have equivalent, matching properties in the consumer context data. It will be appreciated, however, that alternative arrangements can also be used. In some examples, consumer context data may be considered to match selector data from a rollout record when each consumer context property has a matching property in the rollout selector data having an equivalent value.

Figure 10:
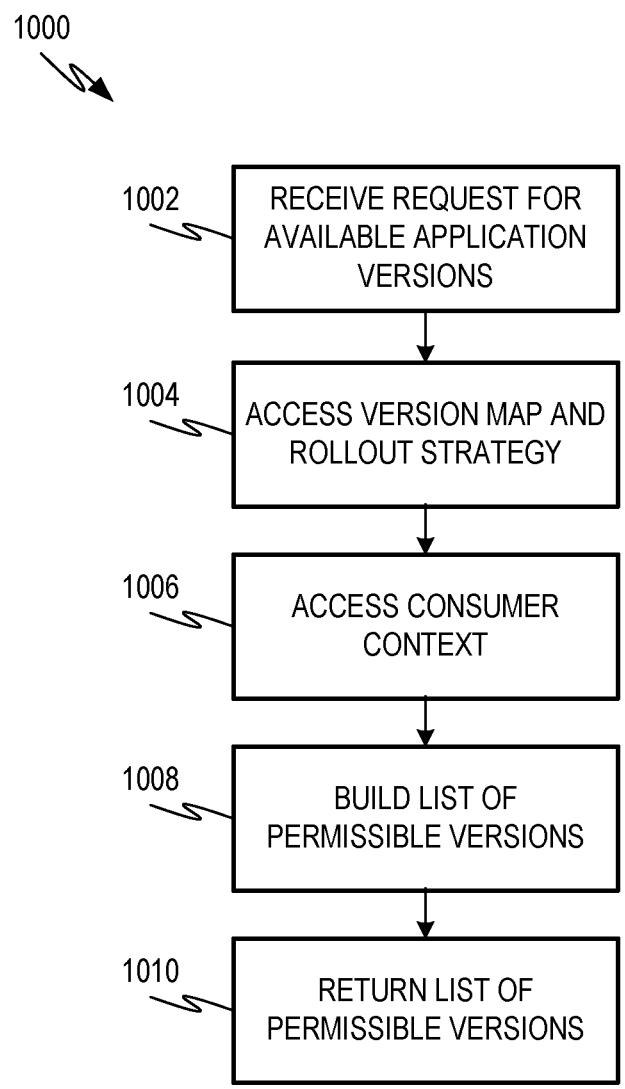
FIG. 10 is a flowchart showing one example of a process flow that may be executed in the environment of FIG. 6 to respond to a request for an indication of the permissible versions for a user group.

FIG. 10 is a flowchart showing one example of a process flow 1000 that may be executed in the arrangement 600 to respond to a request for an indication of the permissible versions for a user group 614, 616, 618, 620. For example, the process flow 1000 may be executed when a user from a user group 614, 616, 618, 620 requests that an application instance 622, 624, 626, 628 be initiated and/or upgraded.

At operation 1002, the version catalog service 607 receives the request for a list of permissible application versions for a user group 614, 616, 618, 620. For example, the request may be received from a user associated with a user group 614, 616, 618, 620, from the frontend service 612, or any other suitable source. At operation 1004, the version catalog service 607 accesses the product version map 608 and rollout strategy map 609 associated with the application. At operation 1006, the version catalog service 607 accesses consumer context data for the user group 614, 616, 618, 620. The consumer context data may be included with the request and/or accessed from another source.

At operation 1008, the version catalog service 607 builds the requested list of permissible versions for the user group 614, 616, 618, 620. For example, the operation 1008 may be performed as described here with respect to FIGS. 7-9. At operation 1010, the version catalog service 607 returns the list of permissible versions generated at operation 1008. For example, the list of permissible versions may be provided to at least one user of the indicated user group 614, 616, 618, 620. That user may select a version of the application from the list, causing an application instance 622, 624, 626, 628 associated with the user group 614, 616, 618, 620 to be initiated and/or upgraded as described herein.

Figure 11:
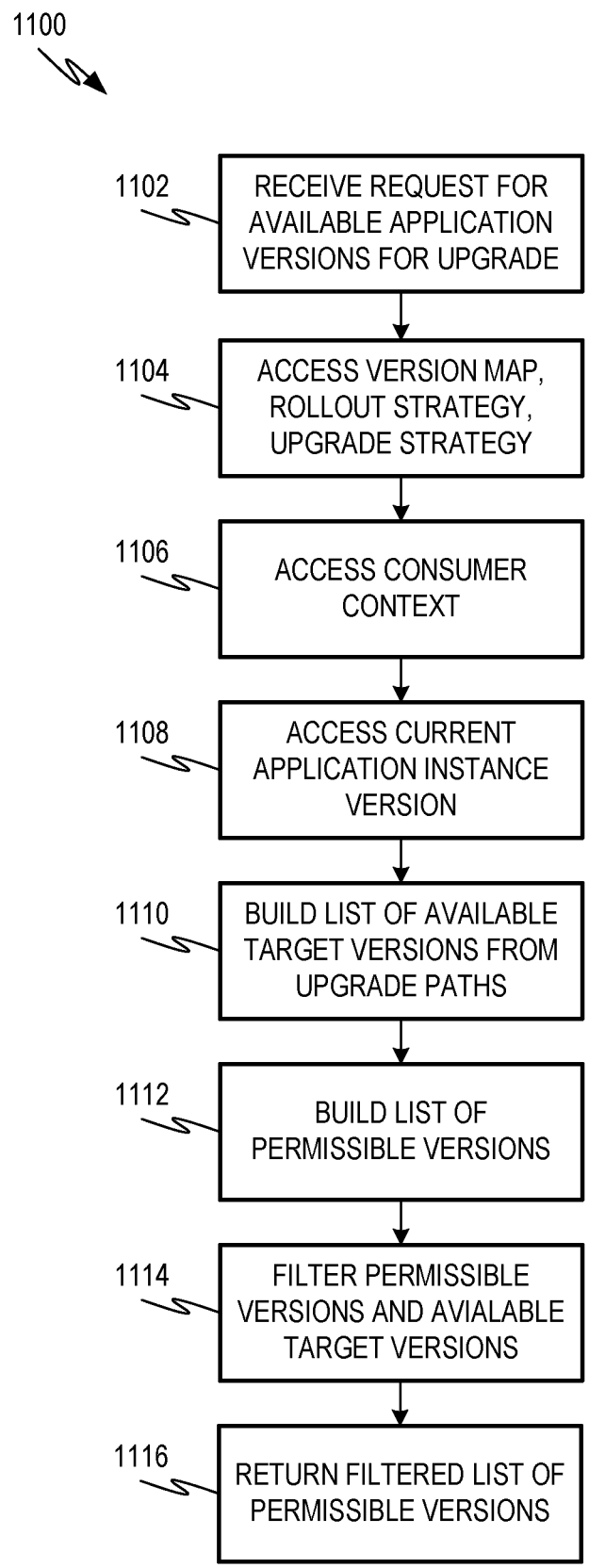
FIG. 11 is a flowchart showing one example of a process flow that may be executed in the environment of FIG. 6 to respond to a request for available upgrades to an application instance using the upgrade strategy map.

FIG. 11 is a flowchart showing one example of a process flow 1100 that may be executed in the arrangement 600 to respond to a request for available upgrades to an application instance 622, 624, 626, 628 using the upgrade strategy map 610. For example, the process flow 1000 may be executed when a user from a user group 614, 616, 618, 620 requests that an application instance 622, 624, 626, 628 be upgraded.

At operation 1102, the version catalog service 607 receives a request for a list of available upgrades for a particular user group 614, 616, 618, 620. At operation 1104, the version catalog service 607 accesses the product version map 608, rollout strategy map 609, and upgrade strategy map 610 for the relevant application. At operation 1106, the version catalog service 607 accesses consumer context data for the user group 614, 616, 618, 620. The consumer context data may be included with the request and/or accessed from another source.

At operation 1108, the version catalog service 607 accesses the version of the application instance 622, 624, 626, 628 currently executing for the user group 614, 616, 618, 620. At operation 1110, the version catalog service 607 builds a set of target versions to which the currently executing instance can be upgraded using the upgrade strategy map 610. This can be performed, for example, as described herein with respect to FIG. 2. At operation 1112, the version catalog service 607 builds a list of permissible versions for the user group 614, 616, 618, 620, for example, as described herein with respect to FIGS. 7-9.

At operation 1114, the version catalog service 607 filters the list of permissible versions and the set of target versions to generate a filtered list of permissible versions. For example, the filtered list of permissible versions may include versions of the application that were both on the set of target versions and on the initial list of permissible versions generated at operation 1112. At operation 1116, the version catalog service 607 returns the filtered list of permissible versions. For example, the list of permissible versions may be returned to a user of the relevant user group 614, 616, 618, 620, to the frontend service 612, or to another suitable component.

Figure 12:
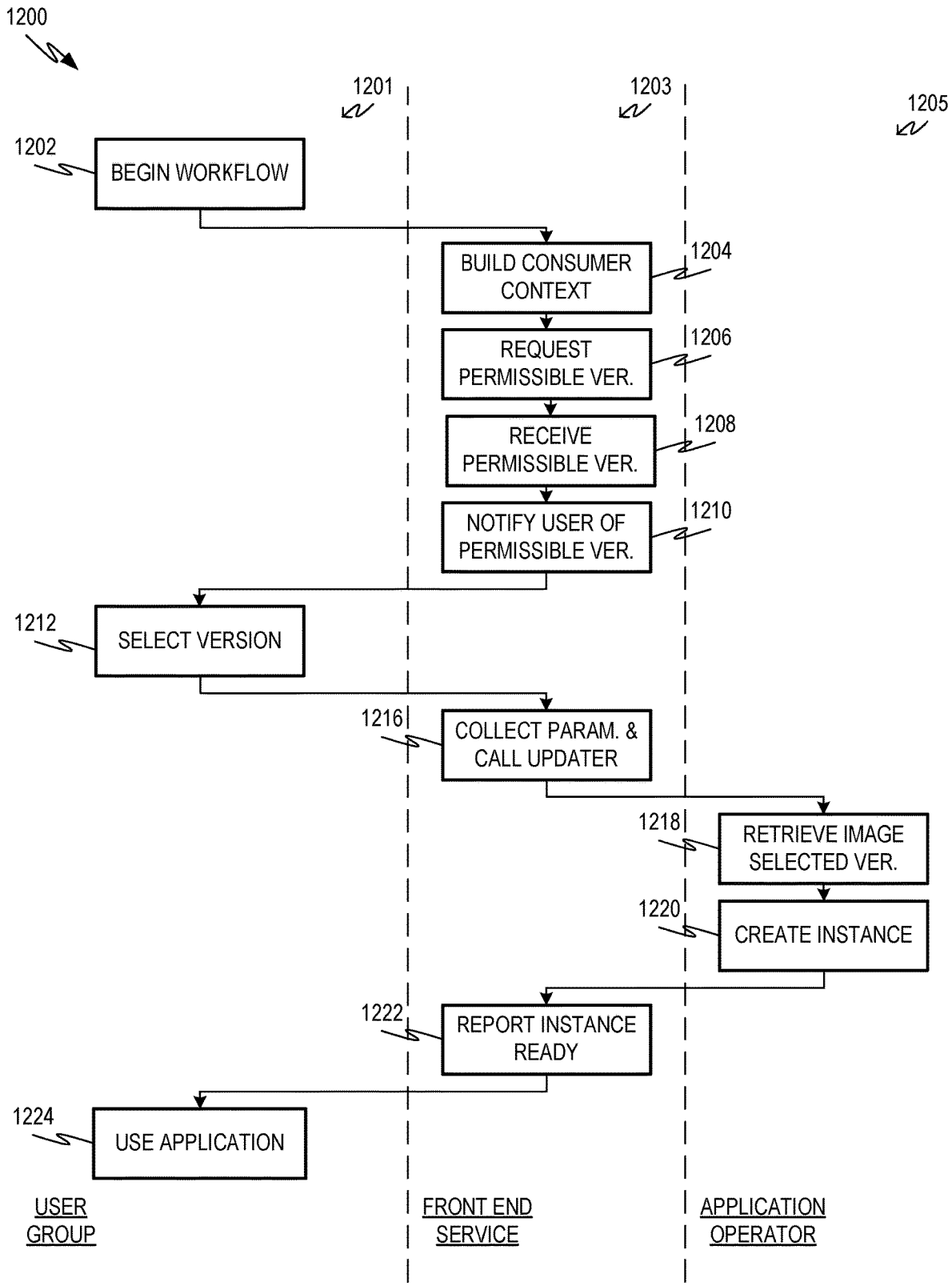
FIG. 12 is a flowchart showing one example of a process flow that may be executed in the environment of FIG. 6 to create a new instance of an application for a user group.

FIG. 12 is a flowchart showing one example of a process flow 1200 that may be executed in the arrangement 600 to create a new instance 622, 624, 626, 628 of an application for a user group 614, 616, 618, 620. The process flow 1200 includes three columns 1201, 1203, 1205 with each column including operations that may be executed by a different component of the arrangement 600. The column 1201 includes operations that can be performed by a user group 614, 616, 618, 620 or, for example, a single user authorized to make changes on behalf of the user group 614, 616, 618, 620. The column 1203 includes operations executed by the frontend service 612. The column 1205 includes operations performed by the application orchestration service 604, such as by the application operator service 605.

At operation 1202, the user group 614, 616, 618, 620 begins the provisioning process, for example, by opening and/or otherwise requesting an application instance via a dashboard or other suitable user interface provided by the frontend service 612. At operation 1204, the frontend service 612 builds consumer context data for the user group 614, 616, 618, 620. This may include, for example, querying the user or users from the user group 614, 616, 618, 620 who opened the dashboard at operation 1202 and/or accessing data about the user and/or user group 614, 616, 618, 620. At operation 1206, the frontend service 612 requests the list of permissible versions for the user group 614, 616, 618, 620. For example, the request may be directed to the version catalog service 607. The version catalog service 607 may access a previously-generated list of permissible applications for the user group 614, 616, 618, 620 and/or may generate or request that the list of permissible versions be generated using the consumer context data generated at operation 1204.

The frontend service 612 receives the list of permissible versions at operation 1208 and provides the list to the user group at operation 1210. For example, the frontend service 612 may provide the list of permissible versions via a user interface provided to a user or users of the user group 614, 616, 618, 620. The user or users from the user group 614, 616, 618, 620 select a version for provisioning at operation 1212.

At operation 1216, the frontend service 612 collects parameters for the selected version and calls the application orchestration service 604 (e.g., the application operator service 605). The collected parameters may include, for example, an indication of the user group 614, 616, 618, 620 making the request and an indication of the selected version from the list of permissible versions.

The application orchestration service 604 (e.g., the application operator service 605), at operation 1218, retrieves the container image of the target version referred to at the product version map 608 and, at operation 1220, creates an application instances 622, 624, 626, 628 of the requested version for the user group 614, 616, 618, 620. Creating the instance may include, for example, spinning up one or more containers to execute a new application instance for the requesting user group 614, 616, 618, 620.

At operation 1222, the frontend service 612 reports to the user group 614, 616, 618, 620 that the new instance of the application is ready for use. The user group 614, 616, 618, 620 may commence to use the new instance of the application at operation 1224.

Figure 13:
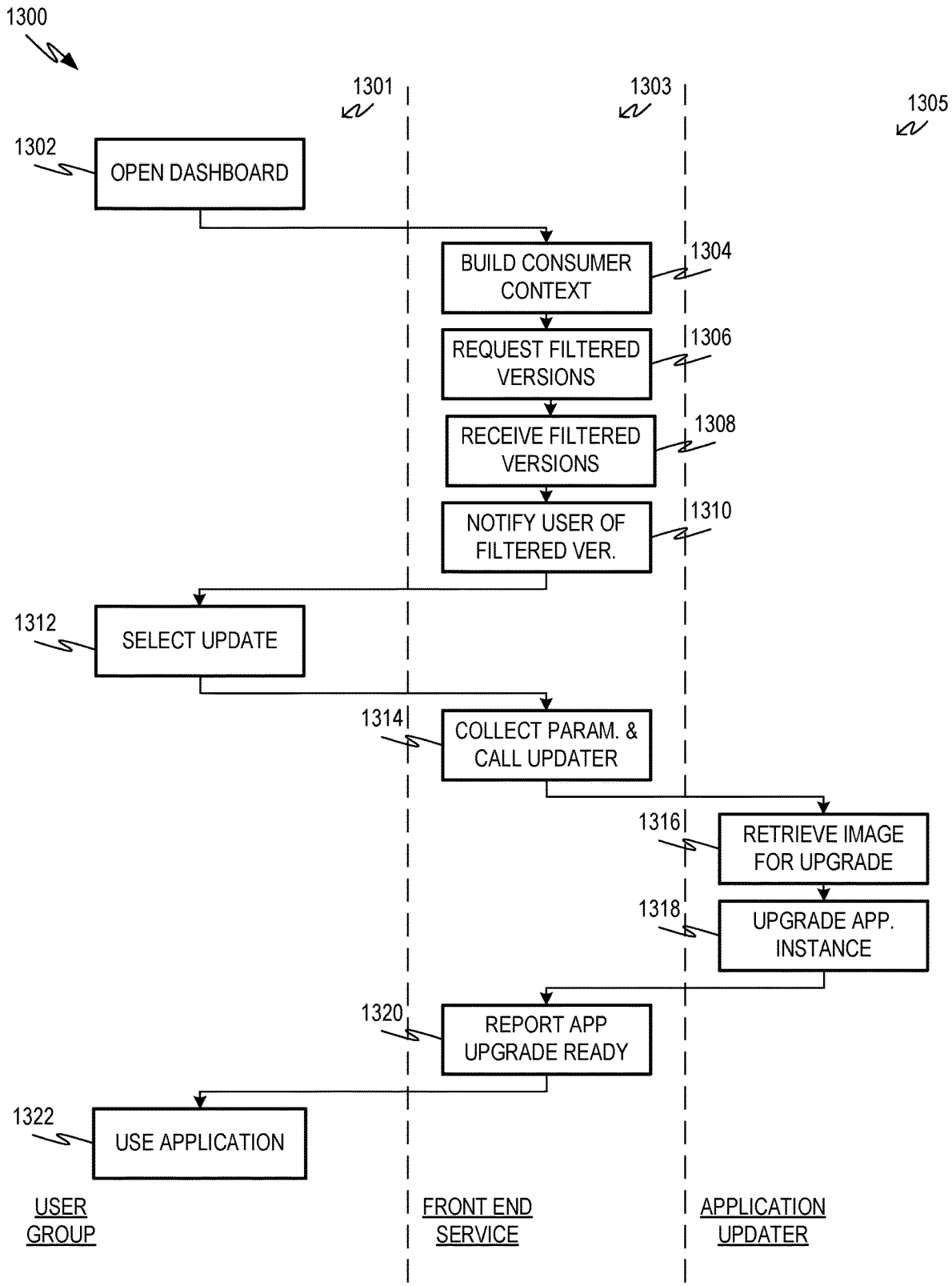
FIG. 13 is a flowchart showing one example of a process flow that may be executed in the environment of FIG. 6 to upgrade an instance of an application for a user group.

FIG. 13 is a flowchart showing one example of a process flow 1300 that may be executed in the arrangement 600 to upgrade an instance 622, 624, 626, 628 of an application for a user group 614, 616, 618, 620. The process flow 1300 includes three columns 1301, 1303, 1305 with each column including operations that may be executed by a different component of the arrangement 600. The column 1301 includes operations that can be performed by a user group 614, 616, 618, 620 or, for example, a single user authorized to make changes on behalf of the user group 614, 616, 618, 620. The column 1303 includes operations executed by the frontend service 612. The column 1305 includes operations performed by the application orchestration service 604, such as by the application updater service 603.

At operation 1302, the user group 614, 616, 618, 620 begins the upgrade process, for example, by opening and/or otherwise requesting an application dashboard. The application dashboard may be any suitable user interface element provided to the user group 614, 616, 618, 620 by the frontend service 612. At operation 1304, the frontend service 612 builds consumer context data for the user group 614, 616, 618, 620. This may include, for example, querying the user or users from the user group 614, 616, 618, 620 who opened the dashboard at operation 1302 and/or accessing data about the user and/or user group 614, 616, 618, 620. At operation 1306, the frontend service 612 requests a filtered list of permissible versions for the user group 614, 616, 618, 620. The filtered list of permissible versions may indicate versions of the application that are available as target versions for upgrade, as indicated by the upgrade strategy map 610 and permissible for use by the user group 614, 616, 618, 620, as indicated by the rollout strategy map 609. The request may be directed to the version catalog service 607. The version catalog service 607 may store a previously-generated list of permissible applications for the user group 614, 616, 618, 620 and/or may generate or request that the list of permissible versions be generated using the consumer context data generated at operation 1304.

The frontend service 612 receives the filtered list of permissible versions at operation 1308 and provides the list to the user group at operation 1310. For example, the frontend service 612 may provide the list of permissible versions via a user interface provided to a user or users of the user group 614, 616, 618, 620. The user or users from the user group 614, 616, 618, 620 select a version for updating at operation 1312. In some examples, the upgrade may be a patch, as described herein.

At operation 1314, the frontend service 612 collects parameters for the selected update and calls the application orchestration service 604 (e.g., the application updater service 603). The collected parameters may include, for example, an indication of the user group 614, 616, 618, 620 making the request, an indication of the current instance 622, 624, 626, 628 of the application for that user group 614, 616, 618, 620 including, for example, a version of the instance, and an indication of the selected target version.

The application orchestration service 604 (e.g., the application updater service 603), at operation 1316, retrieves the container image of the target version referred to at the product version map 608 and, at operation 1318, upgrades the application instance. Upgrading the application instance may include, for example, spinning up one or more containers to execute a new application instance for the requesting user group 614, 616, 618, 620. In some examples, upgrading the application instance may also include executing a data migration at a persistence 630, 632, 634, 636 of the requesting user group 614, 616, 618, 620. For example, the persistence 630, 632, 634, 636 or a portion thereof may be modified from a prior schema to a target schema used by the target version.

At operation 1320, the frontend service reports to the user group 614, 616, 618, 620 that the new instance of the application is ready for use. The user group 614, 616, 618, 620 may commence to use the new instance of the application at operation 1322.

Figure 14:
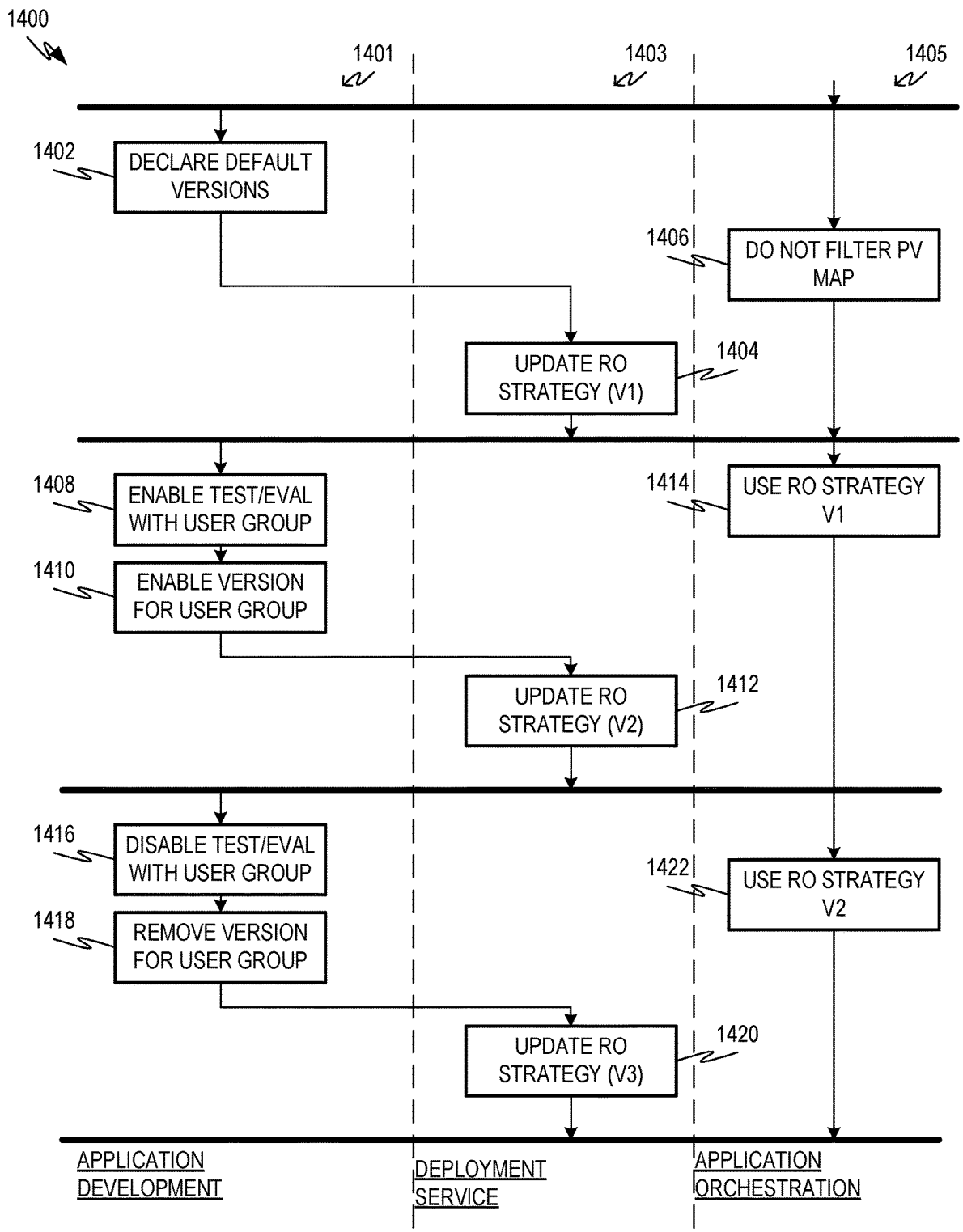
FIG. 14 is a flowchart showing one example of a process flow that may be executed in the environment of FIG. 6 to maintain the rollout strategy map to make an application version available to a particular user group.

FIG. 14 is a flowchart showing one example of a process flow 1400 that may be executed in the arrangement 600 to maintain the rollout strategy map 609 to make an application version available to a particular user group 614, 616, 618, 620. The process flow 1400 includes three columns 1401, 1403, 1405 with each column including operations that may be executed by a different component of the arrangement 600. The column 1401 includes operations that can be performed by an application development team. The application development team may be, for example, a user group 614, 616, 618, 620 that has development and/or administrative responsibilities for an application. The column 1403 includes operations executed by a deployment service, such as the deployment service 638. The column 1405 includes operations performed by the application orchestration service 604, such as by the application operator service 605.

At operation 1402, the application development team declares a default version for the application. This may include, for example, generating and/or updating one or more rollout records at the rollout strategy map 609. For example, the deployment service may add a rollout record to the rollout strategy map 609. The rollout record may not include selector data or may include selector data indicating that the selected default version is a default version that can be provided to different user groups 614, 616, 618, 620. At operation 1404, the deployment service updates a rollout strategy map 609 for the application to indicate the default version.

Before the rollout strategy map 609 is updated at operation 1404, the application orchestration service 604 may not utilize the rollout strategy map 609 to filter versions of the application from the product version map 608. After the rollout strategy map 609 is updated at operation 1404, the application orchestration service 604 may begin utilizing the updated rollout strategy map 609, referred to as V1, at operation 1414. For example, when the user group 614, 616, 618, 620 provisions a new instance 622, 6234, 626, 628 of the application and/or upgrades a previous instance, the default version may be available.

At operation 1408, the application development team enables a first version of the application for a user group 614, 616, 618, 620. The user group 614, 616, 618, 620 may be, for example, an internal user group that is part of a QA team at the entity developing the application. In another example, the user group 614, 616, 618, 620 is a group associated with a customer who is to be authorized to access a beta or other early or pre-release version. At operation 1410, the application development team enables a version of the application for the user group. The enabled version may be, for example, a beat version or other pre-release version for the user group 614, 616, 618, 620. In various examples, however, any version of the application may be enabled for the user group. Enabling the version may include updating the rollout strategy map 609 and requesting that the deployment service implement the update at the cloud environment 602. Before the rollout strategy is enabled at operation 1404, the product version map may be used, at operation 1406, without filtering from the rollout strategy map.

At operation 1412, the deployment service may update the rollout strategy map to another updated rollout strategy map 609 version, called V2 in FIG. 14. This may include, for example, adding at least one rollout record to the rollout strategy map 609. The rollout record may include an indication of the version enabled for the user group 614, 616, 618, 620 and selector data indicating consumer context properties of the user group 614, 616, 618, 620. After the update at operation 1412, the application orchestration service 604 may begin to use the V2 version of the rollout strategy map 609 at operation 1422. For example, when the user group 614, 616, 618, 620 requests initiation of an application instance 622, 624, 626, 628 and/or an upgrade to an existing instance, the first version may be available.

At operation 1416, the application development team may disable the first version of the application for the user group 614, 616, 618, 620. For example, a bug in the version may have been detected. Also, in some examples, the first version may have been made available for an evaluation period that has passed. At operation 1418, the application development team removes the first version of the application for the user group 614, 616, 618, 620. Disabling the first version may include requesting that the deployment service update the rollout strategy map 609.

At operation 1420, the deployment service may update the rollout strategy map to another updated rollout strategy map 609 version, called V3 in FIG. 14. In some examples, the updated rollout strategy map 609 may omit the rollout record referencing the first version from the rollout strategy map 609 and/or include modified selector data in that rollout record so that it does not refer to the user group 614, 616, 618, 620. After the update at operation 1420, the application orchestration service 604 may begin to use the V3 version of the rollout strategy map 609. For example, when the user group 614, 616, 618, 620 requests initiation of an application instance 622, 624, 626, 628 and/or an upgrade to an existing instance, the first version may no longer be available.

In some examples, updating of the rollout strategy map, for example, as described in FIG. 14, may be used to expose and then subsequently remove a testing version of the application. For example, updating of the rollout strategy map at operation 1404 may be to add a testing version rollout record to the rollout strategy map along with testing selector data. The testing version rollout record may describe a testing version of the application that is being made available, for example, to a user group 614, 616, 618, 620. The selector data may indicate the user group or users groups 614, 616, 618, 620 who are to be permitted to use the testing version. After a time, for example, after testing of the test version is complete, the rollout record may be modified again, for example, at operation 1420, to remove the testing version rollout record from the rollout strategy map.

In various examples, application orchestration service maintain application instances executing at a cloud environment. For example, as described herein, application orchestrations service may manage the execution of one or more containers implementing an application instance. The application orchestration service may start one or more containers to implement an application instances. Also, for example, upon the crash of one or more containers implementing an application instance, application orchestration service may restart or re-launch another version of the container.

In some examples, application orchestration service (directly or indirectly) access version metadata from the version metadata persistence to maintain application instances. For example, when spinning up a new instance of an application, the application orchestration may refer to a version metadata record from the metadata persistence, such as a product version map record, to find an identifier of the container image or images that are used to launch the application.

The application orchestration service may also utilize a link to the container image or images for an application instance while the application instance is running. For example, when one or more of the containers implementing an application instance crashes, the application orchestration service may again utilize an indication of the relevant container image or images to restart the crashed container or containers to maintain the application instance.

In some examples, the application orchestration service may refer back to version metadata persistence, for example, at a product version map, to identify container images used to re-start a crashed container during execution of an application instance. Practically, however, if the application orchestration service uses the version metadata persistence to maintain the continued execution of application instances, it may be necessary to maintain version metadata at the version metadata persistence for each application version (e.g., at the production version map) as long as any instance of that application version is executing at the cloud environment.

The number of actual versions of an application executing in the cloud environment and the number of versions supported for provisioning and upgrading, however may not be the same. For example, it may be desirable to remove version metadata from the version metadata persistence for a particular version of the application to prevent new instances of that version from being provisioned without removing application orchestration support for instances of that particular version that are still executing at the cloud environment.

Various examples address these and other issues utilizing instance metadata for an application instance. Instance metadata is metadata describing an application instance that is stored at a container management metadata persistence that is associated with the executing instance. In examples where the application orchestration service implements a Kubernetes® arrangement, the instance metadata, and/or addition thereto, may be created using a custom resource.

In various examples, when an application instance is initiated, the application orchestration service writes an indication of one or more container images used for executing the application instance to the instance metadata. The application orchestration service may be further arranged to refer to the instance metadata associated with an application instance to identify container images for maintaining the application instance. In this way, the version metadata relating to an application version may be removed from the version metadata persistence when it is desirable to no longer launch new instances of the version while permitting maintenance of any existing instance of the version that are already executing.

Figure 15:
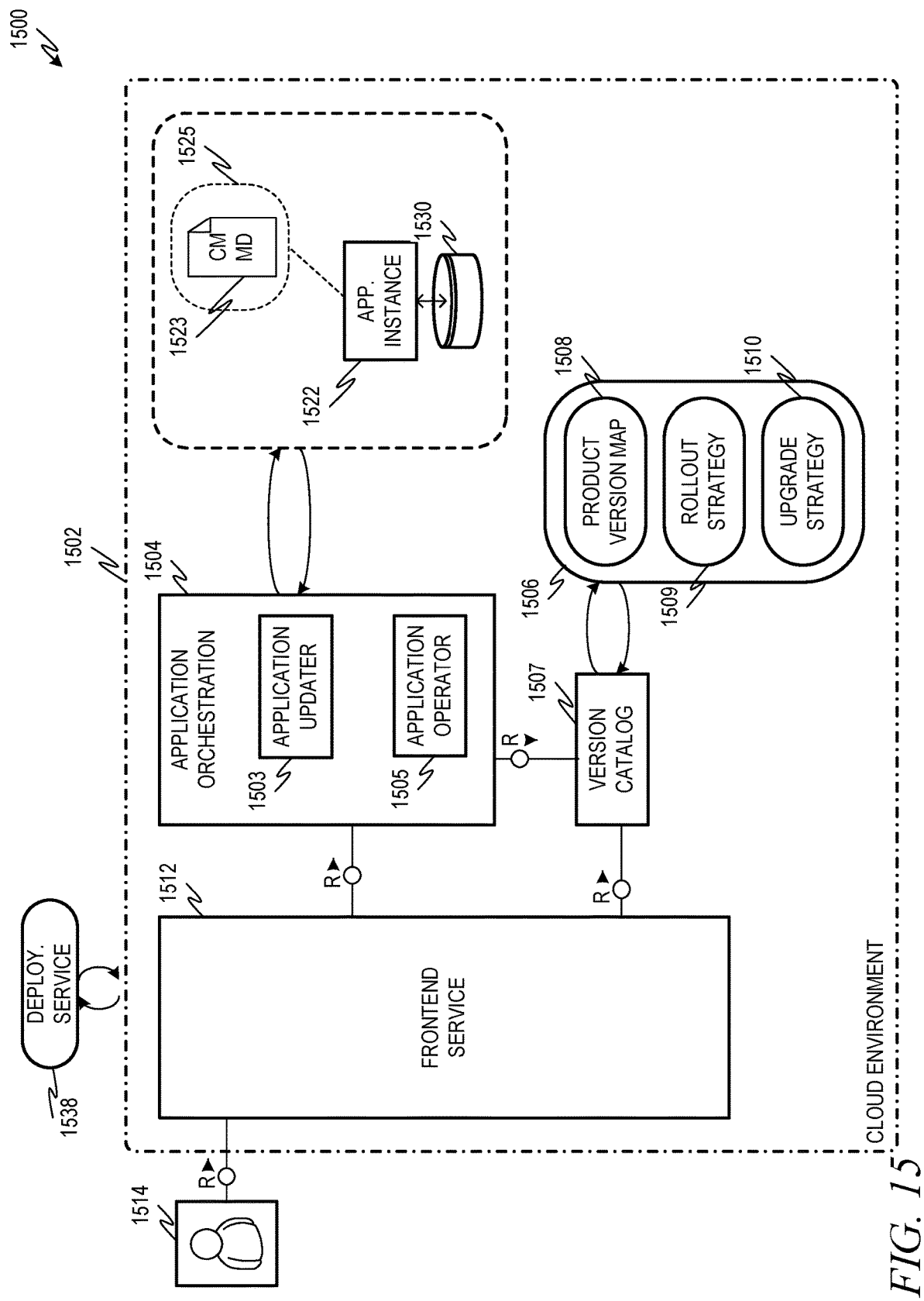
FIG. 15 is a diagram showing one example of an arrangement for maintaining versions of a legacy on-premises software application in a cloud environment using a version metadata record.

FIG. 15 is a diagram showing one example of an arrangement 1500 for maintaining versions of a legacy on-premises software application in a cloud environment 1502 using a version metadata record. The cloud environment 1502 executes instances of applications, such as a database management application. An example application instance 1522 is shown. Although FIG. 15 shows only a single application instance 1522, it will be appreciated that the cloud environment 1502 may execute multiple application instances, such as, for example, shown in FIGS. 1 and 6. The cloud environment 1502 also provides various services 1512, 1504, 1507 for supporting the application instance 1522 (or instances).

The application instance 1522 may be provided to users from a user group 1514. The user group 1514 may include a group of one or more users who use the application instance 1522 at the cloud environment 1502. As described herein, the user group 1514 may be associated with a stakeholder. Although one user group 1514 is shown in FIG. 15, it will be appreciated that some examples may include various different user groups utilizing different application instances, for example, as described herein with respect to FIGS. 1 and 6.

The cloud environment 1502 may include one or more computing devices, such as servers, for executing the application instance 1522 and services 1512, 1504, 1507. In some examples, the cloud environment 1502 is one of a number of cloud environments implemented by a cloud service provider at different geographic locations. For example, the cloud environment 1502 may be implemented at a data center or data centers geographically near to the user group 1514. Other cloud environments similar to the cloud environment 1502 may be implemented at data centers geographically near to other user groups to provide the application to those user groups.

The cloud environment 1502 also implements a persistence 1530. For examples, when the application instance 1522 implements a database management system, the persistence 1530 may store data managed by the database management application. The persistence 1530 may be implemented using any suitable data storage device or devices such as, for example, one or more disks, one or more solid state drives, one or more random access memories, etc. In some examples, the software application implemented at the cloud environment 1502 is a database management application for an in-memory database such as, for example, the HANA® and S/4 HANA® systems available from SAP SE of Walldorf, Germany.

The software application provided by the cloud environment 1502 of FIG. 15 may be a legacy on-premises application converted for provision by the cloud environment 1502. For example, the application instance 1522 may comprise one or more containers including executables, libraries, and/or other components for providing the software application. In some examples, containers for executing the various application instances 1522, 1524, 1526, 1528 are arranged as Kubernetes® clusters, for example, managed and/or maintained by the application orchestration service 1504.

The cloud environment 1502 also executes one or more services 1507, 1504, 1512 for managing execution of the application instance 1522 (and other application instances executing at the cloud environment 1502). The services 1504, 1507, 1512 may execute at the cloud environment 1502 in one or more containers. A frontend service 1512 may interface with the user group 1514. For example, the frontend service 1512 may provide users from the user group 1514 with a user interface to allow the users to manage the application instance 1522 and/or to launch new application instances. In some examples, the frontend service 1512 provides users from the user group 1514 with data about available target versions to which the user group's executing application instance 1522 can be upgraded, as described herein.

Application orchestration services 1504 may manage the execution of the application instance 152. The application orchestration service 1504 may be implemented as a single service and/or as a set of one or more subservices. In the example of FIG. 15, the application orchestration services 1504 include an application operator service 1505 and an application updater service 1503.

The application operator service 1505 may manage the execution of the one or more containers implementing the application instance 1522 (and other application instances executing at the cloud environment 1502). For example, the application operator service 1505 may begin the execution of one or more containers for implementing the application instance 1522, for example, from on one or more container images associated with the one or more containers. Also, if one or more containers associated with the application instance 1522 crash, the application operator service 1505 may spin up a replacement for the crashed container or containers. The application updater service 1503 may manage application versions.

In the example of FIG. 15, the version metadata persistence 1506 includes a product version map 1508, an upgrade strategy map 1510 and a rollout strategy map 1509. The product version map 1508 and upgrade strategy map 1510 may be similar to the product version map 108, 608 and upgrade strategy map 110, 610 described herein with respect to FIGS. 1 and 6. The rollout strategy map 1509 may include rollout records, with each rollout record describing a version of the application and selector data, where the selector data describes user group context properties describing user groups that are permitted to use the indicated application version, for example, similar to the rollout strategy map 609 of FIG. 6.

The arrangement 1500 also includes a version catalog service 1507, which may be similar to the version catalog service 607 of FIG. 6. The version catalog service 1507 may be used by the application orchestration service 1504 and/or the frontend service 1512 to access the version metadata persistence 1506. For example, the version catalog service 1507 may utilize the product version map 1508, rollout strategy map 1509, and/or upgrade strategy map 1510 to generate lists of permissible versions for the user group 1514 and/or for other user groups using the cloud environment 1502. A list of permissible versions for a user group 1514 indicates versions of the application that are both available and that the user group 1514 is authorized to use. The version catalog service 1507 may generate and/or update a list of permissible versions for the user group 1514 for example, upon a request from the user group 1514 to initiate and/or upgrade the application instance 1522 and/or periodically.

In some examples, the application orchestration service 1504 may request that the version catalog service 1507 utilize the rollout strategy map 1509 in conjunction with the upgrade strategy map 1510. For example, the list of permissible versions for the user group 1514 at the version catalog service 1507 may include versions that the user group 1514 is permitted to use, as indicated by the rollout strategy map 1509 and that are permissible upgrades from the current version of an application instance 1522 for the user group 1514. An example rollout strategy map 1509 is provided by EXAMPLE 3.

In the example of FIG. 15, the application instance 1522 comprises instance metadata 1523. The instance metadata 1523 may be implemented at a container management metadata persistence 1525. The container management metadata persistence 1525 may be implemented, for example, by the application orchestration service 1504. In examples where the application orchestration service 1504 implements a Kubernetes® container orchestration system, the container management metadata persistence 1525 may be implemented using a custom resource. In some examples, the container management metadata persistence 1525 persists if one or more of the containers implementing the application instance 1522 crash. In this way, the application orchestration service 1504 may refer to the instance metadata 1523 to re-start a crashed or otherwise failed container of the application instance 1522.

The arrangement 1500 of FIG. 15 also includes a deployment service 1538. The deployment service 1538 may execute at one or more computing devices, such as computing devices implemented by the cloud service provider that implements the cloud environment 1502. In some examples, the deployment service 1538 is executed at the same computing devices that implement the environment 1502. The deployment service 1538 may be programmed to launch the cloud environment 1502, for example, as part of a CI/CD pipeline. In some examples, the deployment service 1538 may also be used to update the metadata persistence 1506, for example, as described herein. For example, the CI/CD pipeline may be used to generate new versions, patches, etc. for the application instances 1522, 1524, 1526, 1528. When the deployment service 1538 deploys new version, patch, upgrade, or the like, it may also make appropriate upgrades to the metadata persistence 1506.

Figure 16:
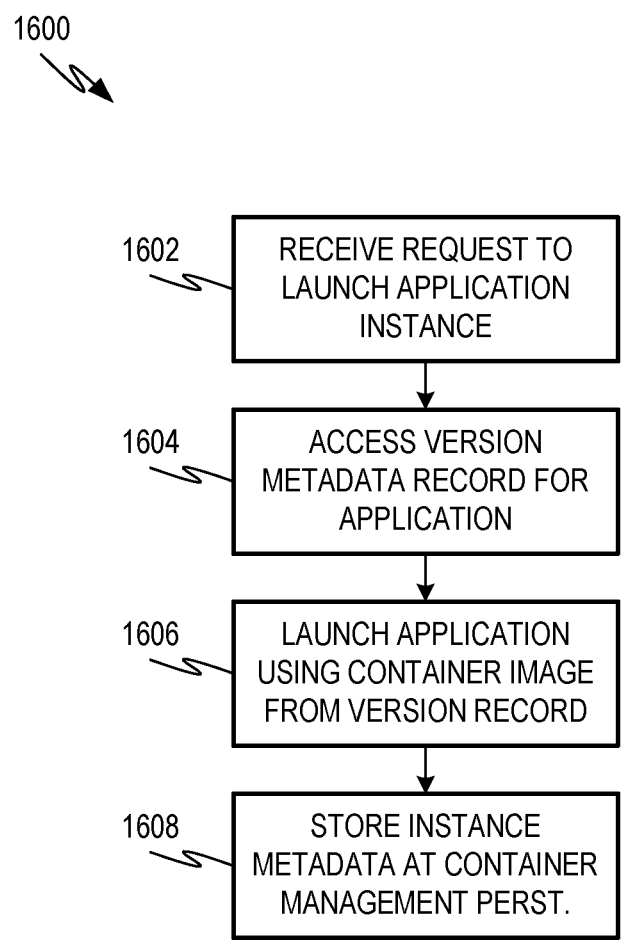
FIG. 16 is a flowchart showing one example of a process flow that may be executed by in the arrangement of FIG. 15 to launch the application instance using instance metadata.

FIG. 16 is a flowchart showing one example of a process flow 1600 that may be executed by in the arrangement 1500 of FIG. 15 to launch the application instance 1522 using instance metadata 1523. At operation 1602, the application orchestration service 1504 (e.g., the application operator service 1505 thereof) receives a request to launch the application instance. The request may be received from the user group 1514 and may indicate a version of the application that is to be launched as the requested instance, as described herein.

At operation 1604, the application orchestration service 1504 accesses a version metadata record for the application. The version metadata record may be, for example, a product version map record stored at the product version map 1508. The version metadata may include an indication of one or more containers that are to be executed to implement the version of the application. At operation 1606, the application orchestration service 1504 launches the application instance 1522. At operation 1608, the application orchestration service 1504 stores instance metadata 1523 to the container management metadata persistence 1525.

In this way, the application orchestration service 1504 may utilize the instance metadata 1523 to maintain the application instance 1522 and may not need to refer back to the version metadata during execution of the application instance 1522.

Consider the example version metadata record given by EXAMPLE 4 below:

Example 4

```
apiVersion: products.example.com/v1alpha1
kind: ProductVersionMap
metadata:
    name: Application 2
spec:
    enablement:
        rolloutstrategy: staged-hana-rollout
    versions:
        -     name: Application 2 Edition 2019.32
              releaseCycle: generally-available-quarterly
```

```
            track: 2019.32
            id: 2019.32.10
            version:
                image-host: <docker repository>
                image-name: <application image name>
                image-tag: 2019.32.10
                build-id: 4.00.000.32.10
                release-notes: <url to release notes>
          - name: Application Edition 2019.36
            releaseCycle: evaluation
            track: 2019.36
            id: 2019.36.7
            version:
                image-host: <docker repository>
                image-name: <application image name>
                image-tag: 2019.36.7
                build-id: 4.00.000.36.7
                release-notes: <url to release notes>
            expiration-date: "2029-11-30"
```

The version metadata record illustrated by EXAMPLE 4 may be a product version map record or other suitable record from the version metadata persistence 1506. The version metadata record of EXAMPLE 4 indicates two different versions of an application called Application 2 having different maturity levels. A maturity level field called "generally-available-quarterly" indicates a version of the application called "4.00.000.32.10." A maturity level field called "evaluation" indicates a version of the application called "4.00.000.36.7." Each maturity level field includes version metadata for the referred-to versions including, for example, an image host field indicating a location of one or more container images for implementing the version, and an image name field indicating the name of the one or more container images for implementing the version. In EXAMPLE 4, the version metadata for a version also indicates an image tag, a build identifier, and a link to release notes.

When the user group 1514 requests an instance 1522 of the application, for example, as described at operation 1602, the application orchestration service 1504 may copy the version metadata for the requested application version. The copied version metadata may be stored to the instance metadata 1523, for example, as described at operation 1608. EXAMPLE 5 below shows example instance metadata for the application instance 1522:

Example 5

```
apiVersion: application.example.com/v1alpha1
kind: Application
metadata:
    name: application2-instance
spec:
    product-version:
        releaseCycle: generally-available-quarterly
        track: 2019.32
    ...
status:
    current-product-version:
        name: Application Edition 2019.32
        releaseCycle: generally-available-quarterly
        track: 2019.32
        id: 2019.32.10
        version:
            image-host: <docker repository>
            image-name: <application image name>
            image-tag: 2019.32.10
            build-id: 4.00.000.32.10
            release-notes: <url to release notes>
    ...
```

In EXAMPLE 5, the application orchestration service 1504 has copied version metadata, indicated by the underlined portion, to the instance metadata 1523 for the application instance 1522. The version metadata includes, for example, an indication of at least one container used to implement the version of the application (e.g., image-name, image-tag).

Figure 17:
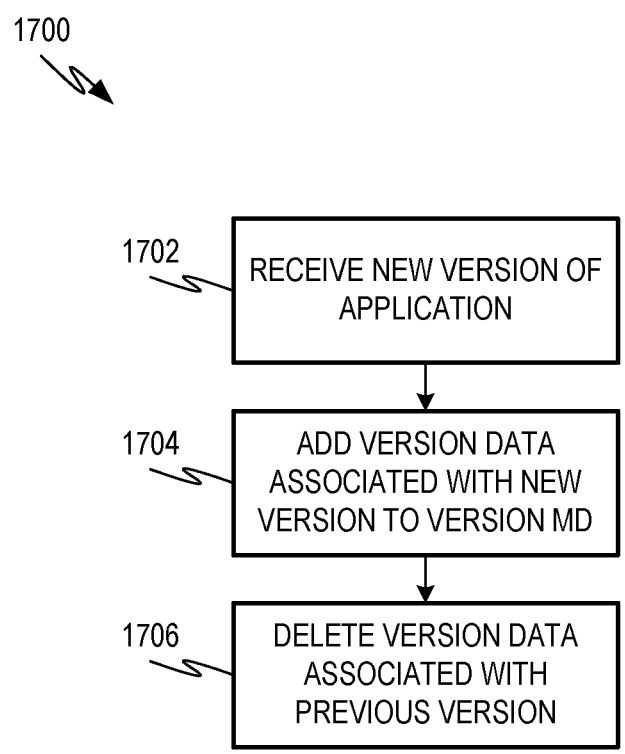
FIG. 17 is a flowchart showing one example of a process flow that may be executed in the arrangement of FIG. 15 to update the version metadata persistence.

FIG. 17 is a flowchart showing one example of a process flow 1700 that may be executed in the arrangement 1500 of FIG. 15 to update the version metadata persistence 1506. The process flow 1700 is executed by one or more services 1504, 1512, 1507, 1538 of the arrangement 1500. In some examples, the process flow 1700 is executed by the deployment service 1538 upon instructions from a user group, such as the user group 1514 and/or an administrative user group.

At operation 1702, the at least one service receives a new version of the application. Receiving the new version of the application may include, for example, receiving one or more container images that may be executed to implement an instance of the new version. In some examples, receiving the new version also includes receiving version metadata for the new version. The version metadata may include, for example, an indication of the at least one container image and a maturity level of new version.

At operation 1704, the at least one service adds to the version metadata persistence 1506 a version metadata record for the new application version. This may include, for example, identifying the version metadata corresponding to the indicated maturity level and writing the new version data to that location. At operation 1706, the at least one service removes version metadata related to the previous version (e.g., the previous version having the same maturity level). In this way, the version metadata corresponding to the new version replaces the corresponding version metadata corresponding to the previous version (e.g., the previous version having the same maturity level). Removal of the version metadata for the previous version may, as described herein, remove the previous version for the versions available to the user group 1514 for launch or upgrade.

Figure 18:
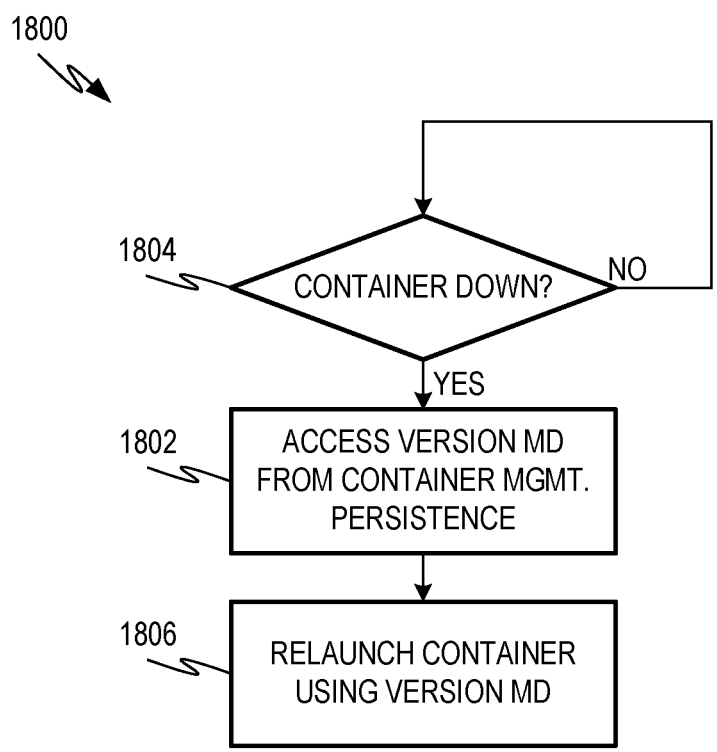
FIG. 18 is a process flow that may be executed in the arrangement of FIG. 15 to maintain an application instance.

Because the version metadata for the previous version may have been copied to the instance metadata for already-executing instances of the previous version, the previous versions may continue to be supported by the application orchestration service 1504 after their corresponding version metadata is removed from the version metadata persistence 1506. For example, FIG. 18 is a process flow 1800 that may be executed in the arrangement 1500 of FIG. 15, e.g., by the application orchestration services, to maintain an application instance. At operation 1804, the application orchestration service 1504 (or other suitable cloud service) determines if one or more of the containers implementing the application instance 1522 is down or has crashed. If not, the application orchestration service 1504 may continue to check whether a container of the application instance 1522 has crashed. For example, the application orchestration service 1504 may check the application instance 1522 at operation 1804 periodically and/or in response to an alert or other indication of that a container may have crashed.

If one or more of the containers implementing the application instance 1522 has crashed, the application orchestration service 1504, at operation 1802, accesses version metadata for the version of the application instance 1522 from the instance metadata 1523 at the container management metadata persistence 1525. The instance metadata 1523, as described herein, may include an indication of one or more container images for restarting the crashed container. The application orchestration service 1504 may use the indicated container image or images to relaunch the crashed container at operation 1806. In this way, the application orchestration service 1504 may maintain the application instance 1522 without referring to the version metadata persistence 1506 after the launch of the application instance 1522.

Figure 19:
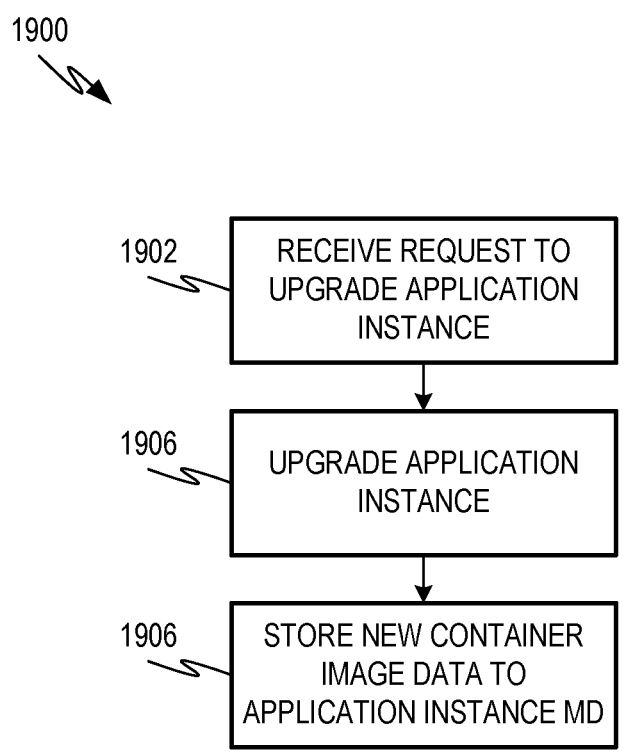
FIG. 19 is a flowchart showing one example of a process flow for updating the application instance in the example arrangement of FIG. 15.

FIG. 19 is a flowchart showing one example of a process flow 1900 for updating the application instance 1522 in the example arrangement 1500 of FIG. 15. The process flow 1900, in some examples, is executed by the application orchestration service 1504, e.g., the application updater service 1503 thereof.

At operation 1902, the application orchestration service 1504 receives a request to upgrade the application instance 1522. The request may be received in any suitable manner. In some examples, the user group 1514 requests the upgrade, as described herein. In other examples, an administrative user group may use the deploy service 1538 to modify a version metadata record associated with the application instance 1522 to indicate a new version of the application. For example, the product version map record or other suitable version metadata record indicating the same maturity level as the application instance 1522 may be updated to refer a new version of the application (e.g., a version different than the version executing at the application instance 1522).

Consider again the example product version map record given by EXAMPLE 4 above. In EXAMPLE 4, the maturity level field corresponding to "generally-available quarterly" indicates an application version "4.00.000.32.10." An example of the product version map record of EXAMPLE 4 after the execution of the operation 1902 is given by EXAMPLE 6 below:

Example 6

```
apiVersion: products.example.com/v1alpha1
kind: ProductVersionMap
metadata:
    name: Application 2
spec:
    enablement:
        rolloutstrategy: staged-hana-rollout
    versions:
        -   name: Application 2 Edition 2019.34
            releaseCycle: generally-available-quarterly
            track: 2019.34
            id: 2019.34.1
            version:
                image-host: <docker repository>
                image-name: <application image name>
                image-tag: 2019.34.1
                build-id: 4.00.000.34.1
                release-notes: <url to release notes>
        -   name: Application Edition 2019.36
            releaseCycle: evaluation
            track: 2019.36
            id: 2019.36.7
            version:
                image-host: <docker repository>
                image-name: <application image name>
                image-tag: 2019.36.7
                build-id: 4.00.000.36.7
                release-notes: <url to release notes>
            expiration-date: "2029-11-30"
```

The underlined portion of EXAMPLE 6 indicates the maturity level field corresponding to "generally-available-quarterly" reflecting an update from the reference to the version "4.00.000.32.10" at EXAMPLE 4 to the reference to a version "4.00.000.34.1" at EXAMPLE 6. In some examples, this modification to the product version map record or other metadata record may prompt an upgrade of the application instance 1522 from the previous version to the new version (e.g., in EXAMPLES 4 and 6 from version "4.00.000.32.10" to version "4.00.000.34.1").

At operation 1906, the application orchestration service 1504 may upgrade the application instance 1522, for example, as described herein. At operation 1906, the application orchestration service 1504 may store new instance metadata indicating at least one container for implementing the new version of the application. In this way, the instance metadata referring to the previous version of the application instance 1522 may be deleted.

Consider again EXAMPLES 4, 5, and 6 herein. Recall that EXAMPLE 5 shows the instance metadata 1523 for the application instance 1522. EXAMPLE 7 below shows an example of the instance metadata for the application instance 1522 after an upgrade to a new version (e.g., from version "4.00.000.32.10" indicated by the version metadata record of EXAMPLE 4 to version "4.00.000.34.1" indicated by the version metadata record of EXAMPLE 6).

Example 7

```
apiVersion: application.example.com/v1alpha1
kind: Application
metadata:
    name: application2-instance
spec:
    product-version:
        releaseCycle: generally-available-quarterly
        track: 2019.32
    ...
status:
    current-product-version:
        name: Application 2 Edition 2019.34
            releaseCycle: generally-available-quarterly
            track: 2019.34
            id: 2019.34.1
            version:
                image-host: <docker repository>
                image-name: <application image name>
                image-tag: 2019.34.1
                build-id: 4.00.000.34.1
                release-notes: <url to release notes>
    ...
```

In EXAMPLE 7, the underlined portion indicates a change relative to EXAMPLE 5 and shows a change from version "4.00.000.32.10" indicated by the version metadata record of EXAMPLE 4 to version "4.00.000.34.1" indicated by the version metadata record of EXAMPLE 6.

In view of the disclosure above, various examples are set forth below. It should be noted that one or more features of an example, taken in isolation or combination, should be considered within the disclosure of this application.

Examples

Example 1 is a method for upgrading a cloud-implemented database management application, comprising: receiving, by a first cloud service executing in a cloud environment, a request from a first user group to access the database management application; accessing, by the first cloud service, consumer context data comprising a plurality of context properties of the first user group; accessing, by the first cloud service, a rollout strategy map describing a set of rollout records, the set of rollout records comprising a first rollout record describing a first version of the database management application and first selector data; comparing, by the first cloud service, the plurality of context properties of the first user group to the first selector data; based on the comparing, adding the first version of the database management application to a list of permissible versions for the first user group; providing, by the first cloud service, the list of permissible versions for the first user group to at least one user associated with the first user group; accessing, by the first cloud service, an indication that the first user group has selected the first version; and initiating execution of a first instance of the first version for the first user group at the cloud environment, the first instance to access a first data persistence associated with the first user group.

In Example 2, the subject matter of Example 1 optionally includes the initiating execution of the first instance comprising: accessing a container image associated with the first version of the database management application; and using the container image to initiate a container at the cloud environment, the container comprising at least one executable for providing the first version of the database management application.

In Example 3, the subject matter of any one or more of Examples 1-2 optionally includes accessing, by the first cloud service, a version map for the database management application, the version map indicating a list of available versions of the database management application, the version map referencing the rollout strategy map.

In Example 4, the subject matter of any one or more of Examples 1-3 optionally includes the request being a request to upgrade the database management application for the first user group, the method further comprising: determining, by the first cloud service, a first version of the database management application used by the first user group; accessing, by the first cloud service, an upgrade strategy map; determining, using the upgrade strategy map, a set of target versions of the database management application suitable for upgrading from the first version; determining that a second version of the database management application is not part of the set of target versions; and removing the second version from the list of permissible versions for the first user group before providing the list of permissible versions for the first user group to the at least one user associated with the first user group.

In Example 5, the subject matter of any one or more of Examples 1-4 optionally includes accessing, by the first cloud service, an indication of a default version of the database management application; and modifying the rollout strategy map to include a default rollout record, the default rollout record describing the default version of the database management application.

In Example 6, the subject matter of any one or more of Examples 1-5 optionally includes accessing, by the first cloud service, an instruction to enable a testing version of the database management application for the first user group; and modifying the rollout strategy map to include a testing version rollout record, the testing version rollout record describing the testing version of the database management application and testing selector data.

In Example 7, the subject matter of Example 6 optionally includes comparing, by the first cloud service, the plurality of context properties of the first user group to the testing selector data; and based on comparing, adding the testing version of the database management application to the list of permissible versions for the first user group.

In Example 8, the subject matter of any one or more of Examples 6-7 optionally includes accessing, by the first cloud service, an instruction to disable the testing version of the database management application for the first user group; and modifying the rollout strategy map to disable the test version for the first user group.

In Example 9, the subject matter of Example 8 optionally includes the modifying of the rollout strategy map to disable the test version for the first user group comprises at least one of modifying the testing selector data and deleting the test version rollout record.

Example 10 is a system for upgrading a cloud-implemented database management application, comprising: a cloud environment comprising at least one computing device, the at least one computing device programmed to perform operations comprising: receiving, by a first cloud service executing in a cloud environment, a request from a first user group to access the database management application; accessing, by the first cloud service, consumer context data comprising a plurality of context properties of the first user group; accessing, by the first cloud service, a rollout strategy map describing a set of rollout records, the set of rollout records comprising a first rollout record describing a first version of the database management application and first selector data; comparing, by the first cloud service, the plurality of context properties of the first user group to the first selector data; based on the comparing, adding the first version of the database management application to a list of permissible versions for the first user group; providing, by the first cloud service, the list of permissible versions for the first user group to at least one user associated with the first user group; accessing, by the first cloud service, an indication that the first user group has selected the first version; and initiating execution of a first instance of the first version for the first user group at the cloud environment, the first instance to access a first data persistence associated with the first user group.

In Example 11, the subject matter of Example 10 optionally includes the initiating execution of the first instance comprising: accessing a container image associated with the first version of the database management application; and using the container image to initiate a container at the cloud environment, the container comprising at least one executable for providing the first version of the database management application.

In Example 12, the subject matter of any one or more of Examples 10-11 optionally includes the operations further comprising accessing, by the first cloud service, a version map for the database management application, the version map indicating a list of available versions of the database management application, the version map referencing the rollout strategy map.

In Example 13, the subject matter of any one or more of Examples 10-12 optionally includes the request being a request to upgrade the database management application for the first user group, the operations further comprising: determining, by the first cloud service, a first version of the database management application used by the first user group; accessing, by the first cloud service, an upgrade strategy map; determining, using the upgrade strategy map, a set of target versions of the database management application suitable for upgrading from the first version; determining that a second version of the database management application is not part of the set of target versions; and removing the second version from the list of permissible versions for the first user group before providing the list of permissible versions for the first user group to the at least one user associated with the first user group.

In Example 14, the subject matter of any one or more of Examples 10-13 optionally includes the operations further comprising: accessing, by the first cloud service, an indication of a default version of the database management application; and modifying the rollout strategy map to include a default rollout record, the default rollout record describing the default version of the database management application.

In Example 15, the subject matter of any one or more of Examples 10-14 optionally includes the operations further comprising: accessing, by the first cloud service, an instruction to enable a testing version of the database management application for the first user group; and modifying the rollout strategy map to include a testing version rollout record, the testing version rollout record describing the testing version of the database management application and testing selector data.

In Example 16, the subject matter of Example 15 optionally includes the operations further comprising: comparing, by the first cloud service, the plurality of context properties of the first user group to the testing selector data; and based on comparing, adding the testing version of the database management application to the list of permissible versions for the first user group.

In Example 17, the subject matter of any one or more of Examples 15-16 optionally includes the operations further comprising: accessing, by the first cloud service, an instruction to disable the testing version of the database management application for the first user group; and modifying the rollout strategy map to disable the test version for the first user group.

In Example 18, the subject matter of Example 17 optionally includes the modifying of the rollout strategy map to disable the test version for the first user group comprises at least one of modifying the testing selector data and deleting the test version rollout record.

Example 19 is a non-transitory machine-readable medium comprising instructions thereon that, when executed by at least one processor at a cloud environment, causes the at least one processor to perform operations comprising: receiving, by a first cloud service executing in a cloud environment, a request from a first user group to access a database management application; accessing, by the first cloud service, consumer context data comprising a plurality of context properties of the first user group; accessing, by the first cloud service, a rollout strategy map describing a set of rollout records, the set of rollout records comprising a first rollout record describing a first version of the database management application and first selector data; comparing, by the first cloud service, the plurality of context properties of the first user group to the first selector data; based on the comparing, adding the first version of the database management application to a list of permissible versions for the first user group; providing, by the first cloud service, the list of permissible versions for the first user group to at least one user associated with the first user group; accessing, by the first cloud service, an indication that the first user group has selected the first version; and initiating execution of a first instance of the first version for the first user group at the cloud environment, the first instance to access a first data persistence associated with the first user group.

In Example 20, the subject matter of Example 19 optionally includes the initiating execution of the first instance comprising: accessing a container image associated with the first version of the database management application; and using the container image to initiate a container at the cloud environment, the container comprising at least one executable for providing the first version of the database management application.

Figure 20:
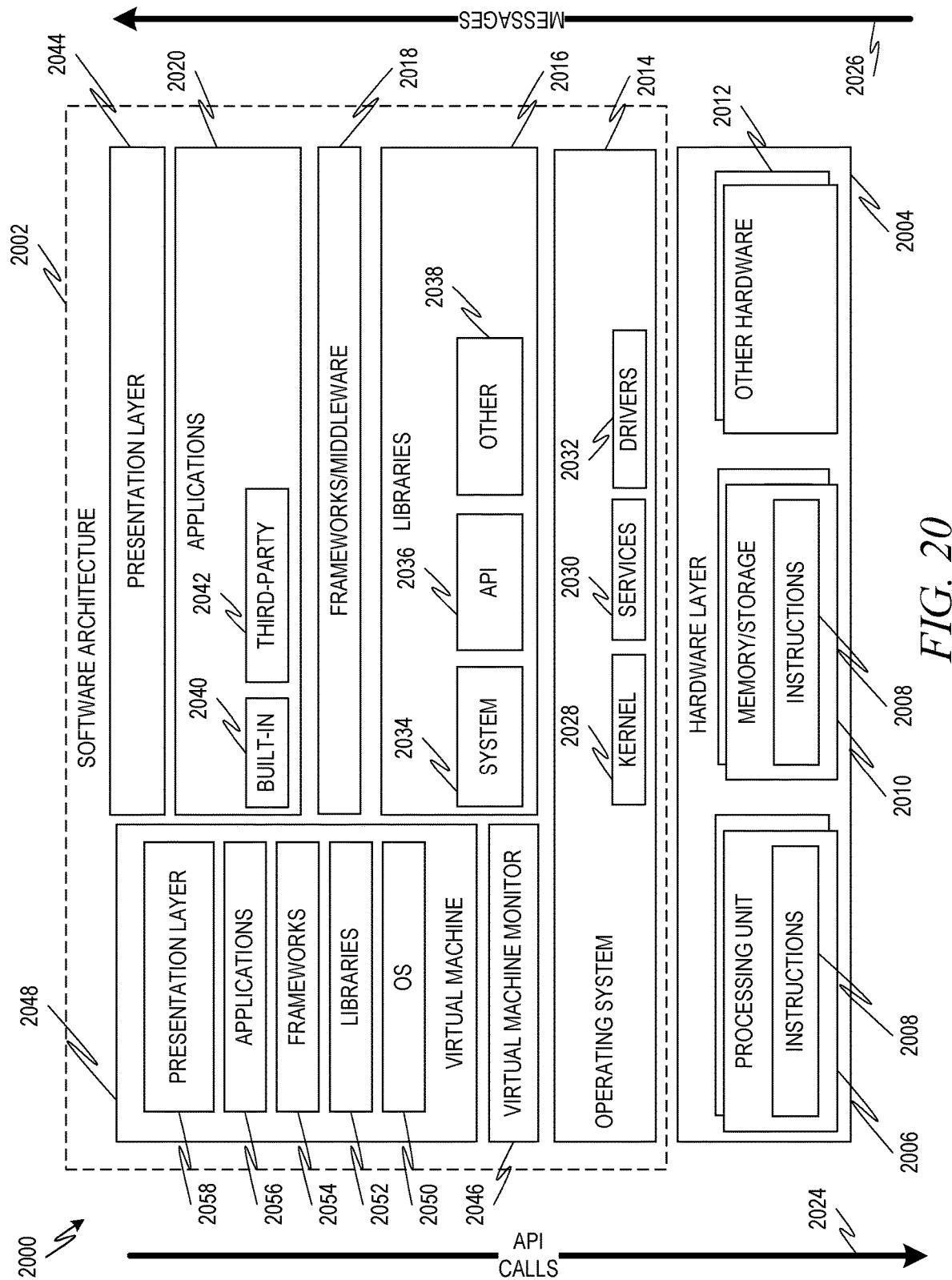
FIG. 20 is a block diagram showing one example of a software architecture for a computing device.

FIG. 20 is a block diagram 2000 showing one example of a software architecture 2002 for a computing device. The architecture 2002 may be used in conjunction with various hardware architectures, for example, as described herein. FIG. 20 is merely a non-limiting example of a software architecture and many other architectures may be implemented to facilitate the functionality described herein. A representative hardware layer 2004 is illustrated and can represent, for example, any of the above referenced computing devices. In some examples, the hardware layer 2004 may be implemented according to the architecture of the computer system of FIG. 20.

The representative hardware layer 2004 comprises one or more processing units 2006 having associated executable instructions 2008. Executable instructions 2008 represent the executable instructions of the software architecture 2002, including implementation of the methods, modules, subsystems, and components, and so forth described herein and may also include memory and/or storage modules 2010, which also have executable instructions 2008. Hardware layer 2004 may also comprise other hardware as indicated by other hardware 2012 which represents any other hardware of the hardware layer 2004, such as the other hardware illustrated as part of the architecture 2002.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020, and presentation layer 2044. Operationally, the applications 2020 and/or other components within the layers may invoke API calls 2024 through the software stack and access a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. In some examples, the services 2030 include an interrupt service. The interrupt service may detect the receipt of an interrupt and, in response, cause the architecture 2002 to pause its current processing and execute an interrupt service routine (ISR) when an interrupt is accessed.

The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform.

The applications 2020 includes built-in applications 2040 and/or third-party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system 2034, APIs 2036, and other libraries 2038), and frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 20, this is illustrated by virtual machine 2048. A virtual machine creates a software environment where applications/modules can execute as if they were executing on a hardware computing device. A virtual machine is hosted by a host operating system (operating system 2014) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 21:
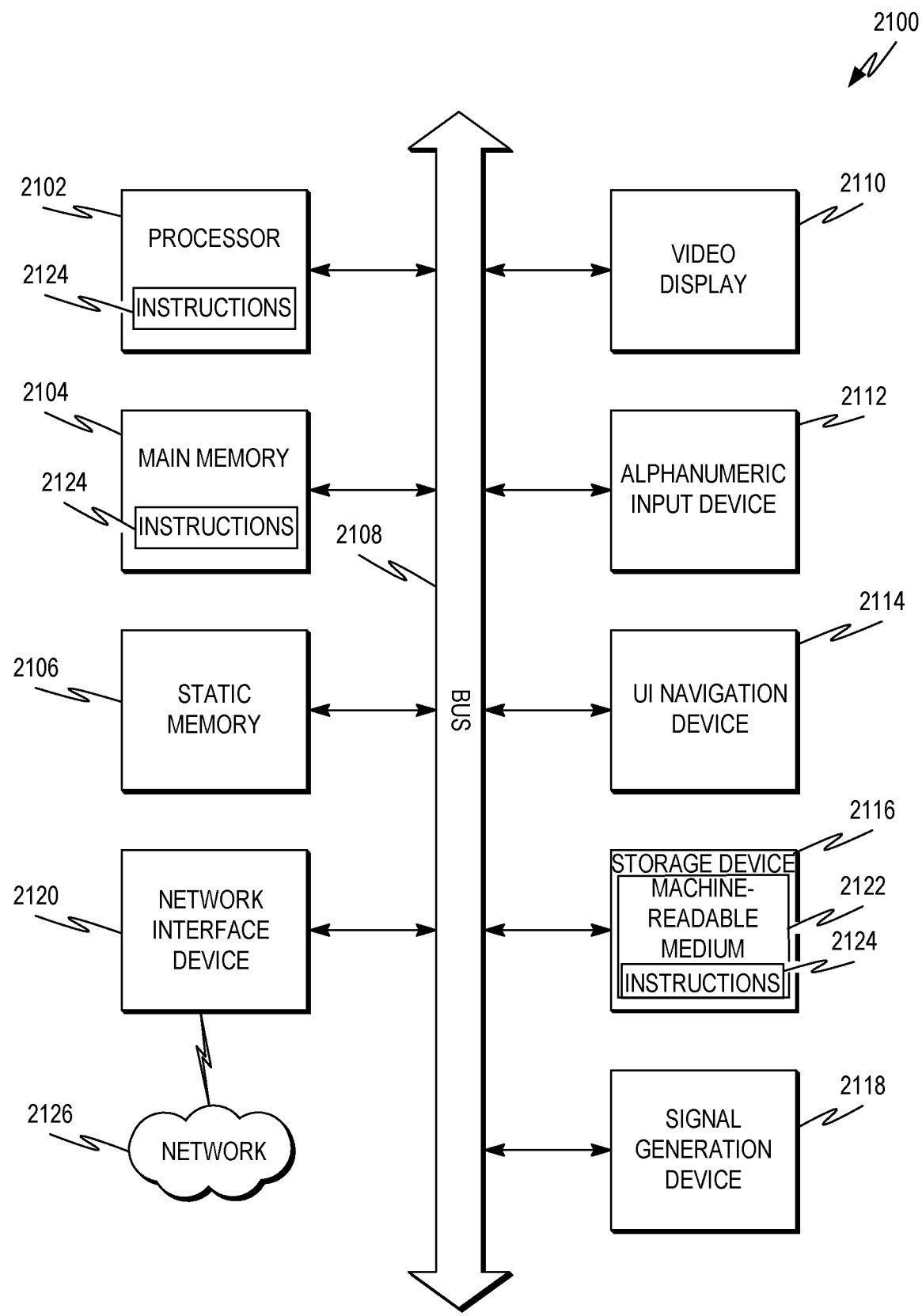
FIG. 21 is a block diagram of a machine in the example form of a computer system within which instructions may be executed for causing the machine to perform any one or more of the methodologies discussed herein.

FIG. 21 is a block diagram of a machine in the example form of a computer system 2100 within which instructions 2124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU), or both), a main memory 2104, and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard or a touch-sensitive display screen), a user interface (UI) navigation (or cursor control) device 2114 (e.g., a mouse), a disk drive unit 2116, a signal generation device 2118 (e.g., a speaker), and a network interface device 2120.

Machine-Readable Medium

The disk drive unit 2116 includes a machine-readable medium 2122 on which is stored one or more sets of data structures and instructions 2124 (e.g., software) embodying or utilized by any one or more of the methodologies or functions described herein. The instructions 2124 may also reside, completely or at least partially, within the main memory 2104 and/or within the processor 2102 during execution thereof by the computer system 2100, with the main memory 2104 and the processor 2102 also constituting machine-readable media 2122.

While the machine-readable medium 2122 is shown in an example embodiment to be a single medium, the term "machine-readable medium" may include a single medium or multiple media (e.g., a centralized or distributed database, and/or associated caches and servers) that store the one or more instructions 2124 or data structures. The term "machine-readable medium" shall also be taken to include any tangible medium that is capable of storing, encoding, or carrying instructions 2124 for execution by the machine and that cause the machine to perform any one or more of the methodologies of the present disclosure, or that is capable of storing, encoding, or carrying data structures utilized by or associated with such instructions 2124. The term "machine-readable medium" shall accordingly be taken to include, but not be limited to, solid-state memories, and optical and magnetic media. Specific examples of machine-readable media 2122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 2124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for upgrading a database management application, comprising:
    receiving, by a service executing in a cloud environment, a request from a user group to access the database management application;
    accessing, by the service, data describing a plurality of properties of the user group;
    accessing, by the service, map data describing a set of map data records, the set of map data records comprising a record describing a first version of the database management application and selector data;
    comparing, by the service, the plurality of properties of the user group to the selector data;
    based on the comparing, adding the first version of the database management application to a list of versions for the user group;
    providing, by the service, the list of versions for the user group to at least one user associated with the user group;
    accessing, by the service, an indication that the user group has selected the first version of the database management application; and
    initiating execution of an instance of the first version of the database management application for the user group at the cloud environment, the instance to access a data persistence associated with the user group.

2. The method of claim 1, the initiating execution of the instance comprising:
    accessing a container image associated with the first version of the database management application; and
    using the container image to initiate a container at the cloud environment, the container comprising at least one executable for providing the first version of the database management application.

3. The method of claim 1, further comprising accessing, by the service, a version map for the database management application, the version map indicating a list of available versions of the database management application, the version map referencing the map data.

4. The method of claim 1, the request being a request to upgrade the database management application for the user group, the method further comprising:
    determining, by the service, the first version of the database management application used by the user group;
    accessing, by the service, an upgrade strategy map;
    determining, using the upgrade strategy map, a set of target versions of the database management application suitable for upgrading from the first version of the database management application;

determining that a second version of the database management application is not part of the set of target versions; and removing the second version from the list of versions for the user group before providing the list of versions for the user group to the at least one user associated with the user group.

5. The method of claim 1, further comprising:

accessing, by the service, an indication of a default version of the database management application; and modifying the map data to include a default record, the default record describing the default version of the database management application.

6. The method of claim 1, further comprising:

accessing, by the service, an instruction to enable a testing version of the database management application for the user group; and modifying the map data to include a testing version record, the testing version record describing the testing version of the database management application and testing selector data.

7. The method of claim 6, further comprising:

comparing, by the service, the plurality of properties of the user group to the testing selector data; and based on comparing, adding the testing version of the database management application to the list of versions for the user group.

8. The method of claim 6, further comprising:

accessing, by the service, an instruction to disable the testing version of the database management application for the user group; and modifying the map data to disable the testing version for the user group.

9. The method of claim 8, the modifying of the map data to disable the testing version for the user group comprises at least one of modifying the testing selector data and deleting the testing version record.

10. A system for upgrading a database management application, comprising:

a cloud environment comprising at least one computing device, the at least one computing device programmed to perform operations comprising:

receiving, by a service executing in a cloud environment, a request from a user group to access the database management application;

accessing, by the service, data describing a plurality of properties of the user group;

accessing, by the service, a map data describing a set of map data records, the set of map data records comprising a record describing a first version of the database management application and selector data;

comparing, by the service, the plurality of properties of the user group to the selector data;

based on the comparing, adding the first version of the database management application to a list of versions for the user group;

providing, by the service, the list of versions for the user group to at least one user associated with the user group;

accessing, by the service, an indication that the user group has selected the first version of the database management application; and initiating execution of an instance of the first version of the database management application for the user group at the cloud environment, the instance to access a data persistence associated with the user group.

11. The system of claim 10, the initiating execution of the instance comprising:

accessing a container image associated with the first version of the database management application; and using the container image to initiate a container at the cloud environment, the container comprising at least one executable for providing the first version of the database management application.

12. The system of claim 10, the operations further comprising accessing, by the service, a version map for the database management application, the version map indicating a list of available versions of the database management application, the version map referencing the map data.

13. The system of claim 10, the request being a request to upgrade the database management application for the user group, the operations further comprising:

determining, by the service, the first version of the database management application used by the user group;

accessing, by the service, an upgrade strategy map;

determining, using the upgrade strategy map, a set of target versions of the database management application suitable for upgrading from the first version;

determining that a second version of the database management application is not part of the set of target versions; and removing the second version from the list of versions for the user group before providing the list of versions for the user group to the at least one user associated with the user group.

14. The system of claim 10, the operations further comprising:

accessing, by the service, an indication of a default version of the database management application; and modifying the map data to include a default record, the default record describing the default version of the database management application.

15. The system of claim 10, the operations further comprising:

accessing, by the service, an instruction to enable a testing version of the database management application for the user group; and modifying the map data to include a testing version record, the testing version record describing the testing version of the database management application and testing selector data.

16. The system of claim 15, the operations further comprising:

comparing, by the service, the plurality of properties of the user group to the testing selector data; and based on comparing, adding the testing version of the database management application to the list of versions for the user group.

17. The system of claim 15, the operations further comprising:

accessing, by the service, an instruction to disable the testing version of the database management application for the user group; and modifying the map data to disable the testing version for the user group.

18. The system of claim 17, the modifying of the map data to disable the testing version for the user group comprises at least one of modifying the testing selector data and deleting the testing version record.

19. A non-transitory machine-readable medium comprising instructions thereon that, when executed by at least one processor at a cloud environment, causes the at least one processor to perform operations comprising:

receiving, by a service executing in a cloud environment, a request from a user group to access a database management application;

accessing, by the service, consumer context data comprising a plurality of properties of the user group;

accessing, by the service, a map data describing a set of map data records, the set of map data records comprising a record describing a first version of the database management application and selector data;

comparing, by the service, the plurality of properties of the user group to the selector data;

based on the comparing, adding the first version of the database management application to a list of versions for the user group;

providing, by the service, the list of versions for the user group to at least one user associated with the user group;

accessing, by the service, an indication that the user group has selected the first version of the database management application; and initiating execution of an instance of the first version of the database management application for the user group at the cloud environment, the instance to access a data persistence associated with the user group.

20. The non-transitory machine-readable medium of claim 19, the initiating execution of the instance comprising:

accessing a container image associated with the first version of the database management application; and sing the container image to initiate a container at the cloud environment, the container comprising at least one executable for providing the first version of the database management application.

* * * * *